United States Patent
Yokono et al.

(10) Patent No.: US 8,582,806 B2
(45) Date of Patent: Nov. 12, 2013

(54) DEVICE, METHOD, AND COMPUTER-READABLE STORAGE MEDIUM FOR COMPOSITING IMAGES

(75) Inventors: Jun Yokono, Tokyo (JP); Yuichi Hasegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 819 days.

(21) Appl. No.: 12/571,923

(22) Filed: Oct. 1, 2009

(65) Prior Publication Data

US 2010/0086175 A1 Apr. 8, 2010

(30) Foreign Application Priority Data

Oct. 3, 2008 (JP) ................ P2008-258011
Mar. 9, 2009 (JP) ................ P2009-055061

(51) Int. Cl.
*G06K 9/00* (2006.01)
(52) U.S. Cl.
USPC ......................... 382/103; 382/100
(58) Field of Classification Search
USPC .................. 382/103, 190, 228, 155
See application file for complete search history.

(56) References Cited

U.S. PATENT DOCUMENTS

| 7,440,594 B2 * | 10/2008 | Takenaka ............... 382/118 |
| 7,957,467 B2 * | 6/2011 | Ha et al. ............... 375/240.24 |
| 8,107,771 B2 * | 1/2012 | Sako et al. ............... 382/298 |
| 8,160,318 B2 * | 4/2012 | Bismuth et al. ............... 382/128 |
| 2004/0158724 A1 * | 8/2004 | Carr et al. ............... 713/186 |
| 2007/0098255 A1 * | 5/2007 | Yokono ............... 382/159 |
| 2008/0002862 A1 * | 1/2008 | Matsugu et al. ............... 382/115 |
| 2008/0232698 A1 * | 9/2008 | Shi et al. ............... 382/225 |
| 2008/0317285 A1 * | 12/2008 | Abe ............... 382/103 |
| 2009/0136137 A1 * | 5/2009 | Kozakaya ............... 382/195 |

FOREIGN PATENT DOCUMENTS

| CN | 101098241 | 1/2008 |
| CN | 101131728 | 2/2008 |
| JP | 2004-062560 | 2/2004 |
| JP | 2004-297167 | 10/2004 |
| JP | 2005-303756 | 10/2005 |
| JP | 2006-165821 | 6/2006 |
| JP | 2006-270380 | 10/2006 |
| JP | 2007-128195 | 5/2007 |
| JP | 2007-158860 | 6/2007 |

(Continued)

OTHER PUBLICATIONS

B. Wu et al, "Detection of Multiple, Partially Occluded Humans in a Single Image by Bayesian Combination of Edgelet Part Detectors", Proc. 10$^{th}$ Int. Conf. Computer Vision, 8 pages (2005).

(Continued)

*Primary Examiner* — Nancy Bitar
(74) *Attorney, Agent, or Firm* — Finnegan, Henderson, Farabow, Garrett & Dunner, L.L.P.

(57) ABSTRACT

An image processing apparatus includes a detector, a setting unit, and an image generator. The detector detects a target object image region from a first image. When one or more predetermined parameters are applicable to a target object within the region detected by the detector, the setting unit sets the relevant target object image region as a first region. The image generator then generates a second image by applying predetermined processing to either the image portion within the first region, or to the image portions in a second region containing image portions within the first image that are not contained in the first region.

18 Claims, 26 Drawing Sheets

(56) References Cited

FOREIGN PATENT DOCUMENTS

| | | |
|---|---|---|
| JP | 2007-272685 | 10/2007 |
| JP | 2007-299297 | 11/2007 |
| JP | 2008-131094 | 6/2008 |

OTHER PUBLICATIONS

N. Dalal et al., "Histograms of Oriented Gradients for Human Detection", CVPR, 8 pages (2005).

* cited by examiner

CLOTHING FEATURE POINT 251  252  253

254  255

256

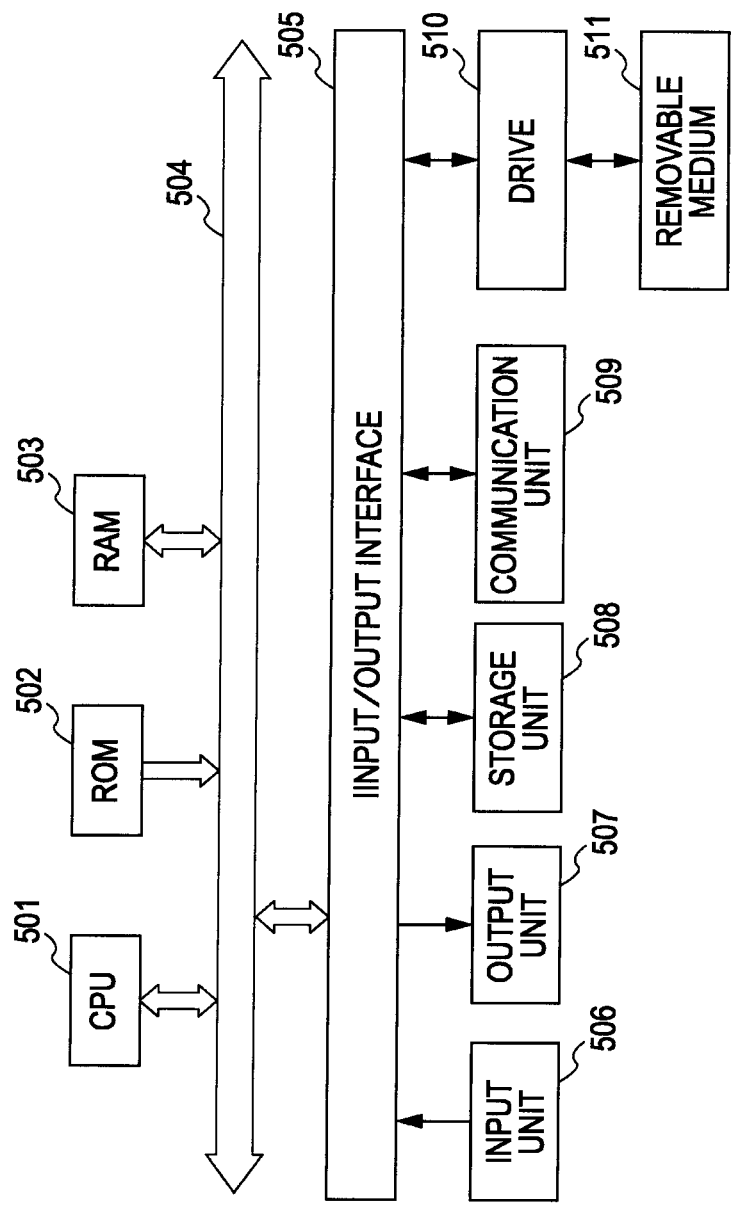

DEVICE, METHOD, AND COMPUTER-READABLE STORAGE MEDIUM FOR COMPOSITING IMAGES

BACKGROUND OF THE INVENTION

1. Field of the Invention

The present invention relates to an image processing apparatus, an image processing method, a program, and a recording medium. More particularly, the present invention relates to an image processing apparatus and method, a recognition apparatus and method, a program, and a recording medium whereby target objects can be more reliably detected from an image.

2. Description of the Related Art

In the related art, technology for detecting humans from images has been researched and developed, primarily for security or in-vehicle applications. (See for example: Navneet Dalal and Bill Triggs, "Histograms of Oriented Gradients for Human Detection", CVPR2005; and B. Wu and R. Nevatia, "Detection of multiple, partially occluded humans in a single image by bayesian combination of edgelet part detectors", In Proc. 10th Int. Conf. Computer Vision, 2005.) In such literature, contour feature values obtained by edge detection are used as the primary feature values for detecting (i.e., recognizing) humans from images. With such technologies, many variations of contour feature values obtained by edge detection are defined as new feature values, and human recognition is conducted therewith.

For example, in the technology proposed by Dalal and Triggs feature values are obtained by taking histograms oriented within small regions of edges. By using such feature values, the technology has the advantage of being more resilient to some degree of contour distortion and similar factors.

SUMMARY OF THE INVENTION

In the above methods for detecting humans or similar figures from an image, contour features are utilized to detect humans or similar figures. However, such methods significantly increase the computational complexity involved, and it is thus problematic to detect humans in real-time, for example.

In light of such circumstances, there is desire for technology enabled to detect target objects such as humans in real-time by improving calculation efficiency.

An image processing apparatus in accordance with a first embodiment of the present invention includes: detecting means configured to detect a target object image region from a first image; setting means configured such that, when one or more predetermined parameters are applicable to a target object within the region detected by the detecting means, the relevant target object image region is set as a first region; and generating means configured to generate a second image by applying predetermined processing to either the image portion within the first region, or to the image portions in a second region containing image portions within the first image that are not contained in the first region.

The detecting means may be configured to include: generating means configured to generate, from the first image, images having differing scale coefficients; extracting means configured to extract feature points from each image generated by the generating means; calculating means configured to calculate feature values for the feature points by filtering the feature points using a predetermined filter; and detecting means configured to detect the target object from the first image by substituting the feature values into a classifier obtained by statistical learning and used for detecting a target object from an image.

The one or more the predetermined parameters may include a parameter stipulating that a region is to be set as the first region if, in that region, the target object is detected to be a human, but a face is not detected.

The one or more predetermined parameters may include a parameter stipulating that a region is to be set as the first region if the target object detected in that region is not a registered target object.

The one or more predetermined parameters may include a parameter stipulating that a region is to be set as the first region when the target object detected in that region is a human, but is determined to not be smiling.

The generating means may generate the second image by compositing the first region with another image obtained in advance.

The generating means may generate the second image by replacing the image portions of the second region with portions of an image obtained in advance, and then composites the replaced image portions with the image portions within the first region.

The generating means may generate the second image by pixelizing (i.e., applying a mosaic process to) the first region.

The generating means may generate the second image by pixelizing the second region.

An image processing method in accordance with another embodiment of the present invention is executed in an image processing apparatus provided with detecting means, setting means, and generating means. The method includes the steps of: causing the detecting means to detect a target object image region from a first image; causing the setting means to operate such that, when one or more predetermined parameters are applicable to a target object within the detected region, the relevant target object image region is set as a first region; and causing the generating means to generate a second image by applying predetermined processing to either the image portion within the first region, or to the image portions in a second region containing image portions within the first image that are not contained in the first region.

A program in accordance with another embodiment of the present invention causes a computer to execute processing in an image processing apparatus provided with detecting means, setting means, and generating means. The processing includes the steps of: causing the detecting means to detect a target object image region from a first image; causing the setting means to operate such that, when one or more predetermined parameters are applicable to a target object within the detected region, the relevant target object image region is set as a first region; and causing the generating means to generate a second image by applying predetermined processing to either the image portion within the first region, or to the image portions in a second region containing image portions within the first image that are not contained in the first region.

In the image processing apparatus, image processing method, and program in accordance with embodiments of the present invention, a target object is detected from an image, and a new image is generated by compositing the target object, or alternatively, the portions other than the target object, into another image.

According to an embodiment of the present invention, real-time detection of target objects such as humans, as well as learning for the same, is possible with improved calculation efficiency.

BRIEF DESCRIPTION OF THE DRAWINGS

FIG. 27 is a block diagram illustrating an exemplary configuration of a computer.

DESCRIPTION OF THE PREFERRED EMBODIMENTS

Hereinafter, embodiments of the present invention will be described with reference to the accompanying drawings.

[System Configuration]

Figure 1:
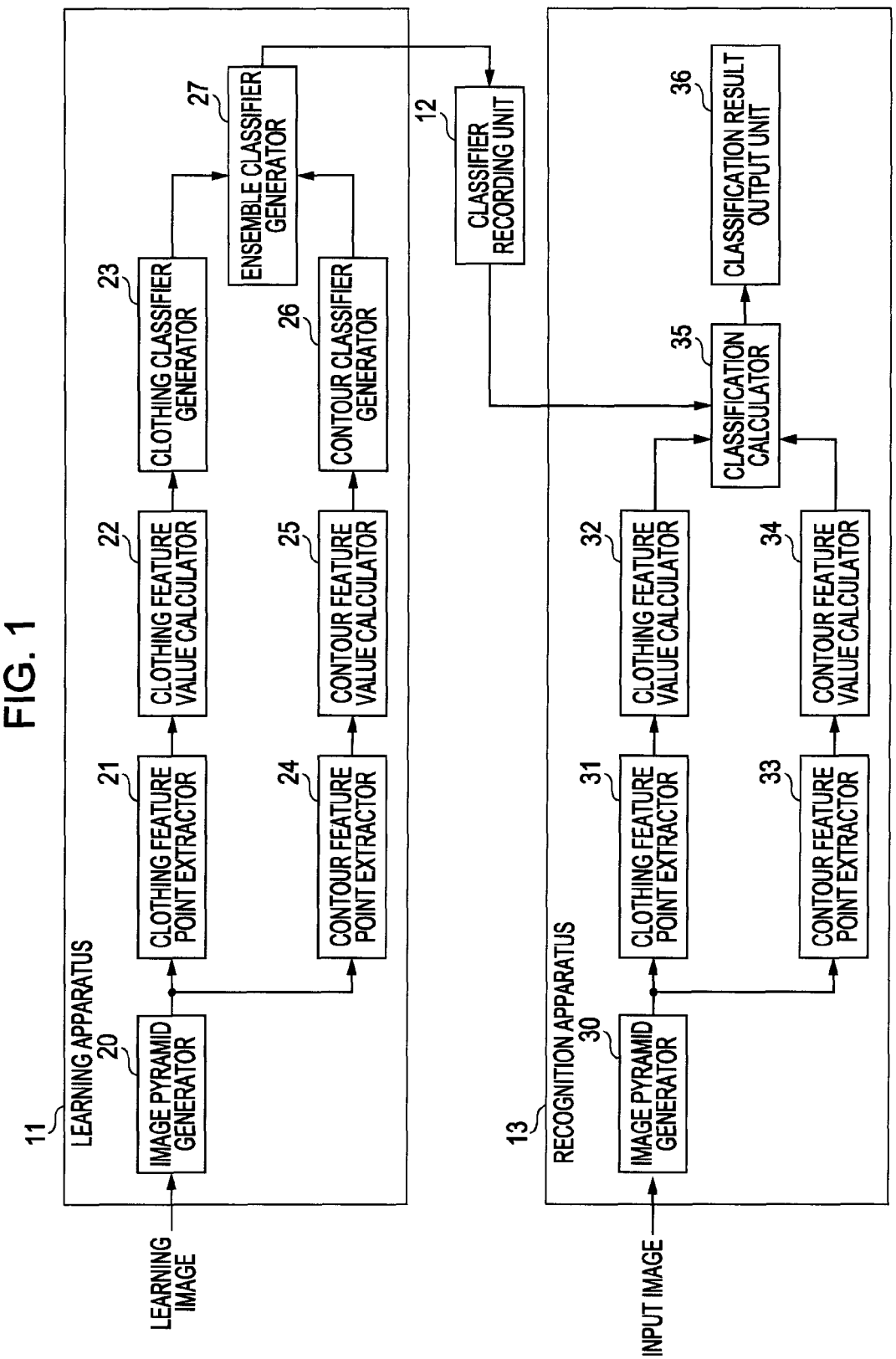
FIG. 1 illustrates a human classification system to which an embodiment of the present invention has been applied.

FIG. 1 is a block diagram illustrating an exemplary configuration of a human classification system to which an embodiment of the present invention has been applied. The human classification system includes a learning apparatus 11, a classifier recording unit 12, and a recognition apparatus 13, and recognizes regions in an input image containing a target object in the form of an image of a human.

On the basis of input learning images, the learning apparatus 11 generates classification feature values and an ensemble classifier, which are used in the recognition apparatus 13 when determining whether or not there exists a target object in the image. The classification feature values and ensemble classifier are recorded in the classifier recording unit 12. Using the classification feature values and the ensemble classifier recorded in the classifier recording unit 12, the recognition apparatus 13 determines whether or not a target object (i.e., an image of a human) exists in the input image, and outputs the classification result.

The learning apparatus 11 includes a image pyramid generator 20, a clothing feature point extractor 21, a clothing feature value calculator 22, a clothing classifier generator 23, a contour feature point extractor 24, a contour feature value calculator 25, a contour classifier generator 26, and an ensemble classifier generator 27.

The image pyramid generator 20 generates a plurality of images having respectively different resolutions from an input learning image, and then supplies the images as an image pyramid to the clothing feature point extractor 21 and the contour feature point extractor 24. For example, an image pyramid having eight layers of resolution from level L1 to level L8 may be generated, wherein the L1 image has the highest resolution, and wherein the resolution of the images decrease in order from L1 to L8.

From each image constituting the image pyramid generated by the image pyramid generator 20 (each image also being referred to as a learning image), the clothing feature point extractor 21 extracts several pixels in that learning image as clothing feature points, which are used when generating a clothing classifier. The extracted clothing feature points are supplied to the clothing feature value calculator 22 together with the learning images. Herein, a clothing classifier is a strong classifier made up of a plurality of weak classifiers, and generated by statistical learning. The clothing classifier, utilizing the features of a person's clothing, is used when determining whether or not a human image region exists in the input image.

For each clothing feature point received from the clothing feature point extractor 21, the clothing feature value calculator 22 creates a single pair by pairing that clothing feature point with another clothing feature point. In addition, on the basis of the learning images received from the clothing feature point extractor 21, the clothing feature value calculator 22 calculates a clothing feature value for each pair of clothing feature points, which indicates the texture distance between two arbitrary regions. The clothing feature values thus solved for and the learning images are supplied to the clothing classifier generator 23.

On the basis of the learning images and the clothing feature values supplied from the clothing feature value calculator 22, the clothing classifier generator 23 conducts statistical learning processing according to Adaboost, for example, and generates a clothing classifier for recognizing a target object (i.e., a person). In addition, the clothing classifier generator 23 supplies the generated clothing classifier to the ensemble classifier generator 27.

From each image constituting the image pyramid generated by the image pyramid generator 20 (each image also being referred to as a learning image), the contour feature point extractor 24 extracts several pixels in that learning image as contour feature points, which are used when generating a contour classifier. The extracted contour feature points and the learning images are supplied to the contour feature value calculator 25. Herein, a contour classifier is a strong classifier made up of a plurality of weak classifiers, and generated by statistical learning. The contour classifier, utilizing a person's contours, is used when determining whether or not a human image region exists in the input image.

On the basis of the learning images received from the contour feature point extractor 24, and by means of filter processing using a steerable filter, for example, the contour feature value calculator 25 calculates a contour feature value for each contour feature point, which indicates the extracted contours. The contour feature values thus solved for and the learning images are supplied to the contour classifier generator 26. On the basis of the learning images and the contour feature values supplied from the contour feature value calculator 25, the contour classifier generator 26 conducts statistical learning processing according to Adaboost, for example, and generates a contour classifier for recognizing a target object (i.e., a person). In addition, the contour classifier generator 26 supplies the generated contour classifier to the ensemble classifier generator 27.

The ensemble classifier generator 27 combines the clothing classifier from the clothing classifier generator 23 with the contour classifier from the contour classifier generator 26 to generate an ensemble classifier, which is supplied to and recorded in the classifier recording unit 12. In addition, the clothing feature values for the clothing feature point pairs and the contour feature values for the contour feature points, which are used when recognizing a target object using the ensemble classifier, are also supplied to the classifier recording unit 12 by the ensemble classifier generator 27 and recorded as classification feature values.

The recognition apparatus 13 includes a clothing feature point extractor 31, a clothing feature value calculator 32, a contour feature point extractor 33, a contour feature value calculator 34, a classification calculator 35, and a classification result output unit 36. Each of the components from the clothing feature point extractor 31 to the contour feature value calculator 34 in the recognition apparatus 13 respectively processes an input image in which a target object is to be recognized similarly to the clothing feature point extractor 21, the clothing feature value calculator 22, the contour feature point extractor 24, and the contour feature value calculator 25 in the learning apparatus 11. For this reason, detailed description of the above components is omitted.

The classification calculator 35 reads the classification feature values and the ensemble classifier recorded in the classifier recording unit 12. In addition, the classification calculator 35 substitutes into the ensemble classifier and computes information corresponding to the clothing feature values received from the clothing feature value calculator 32 and the contour feature values received from the contour feature value calculator 34. The classification result output unit 36 acquires the computational from the classification calculator 35, and on the basis of that computational result, outputs a classification result indicating whether or not a target object was recognized in the input image.

[Configuration of Clothing Classifier Generator]

Figure 2:
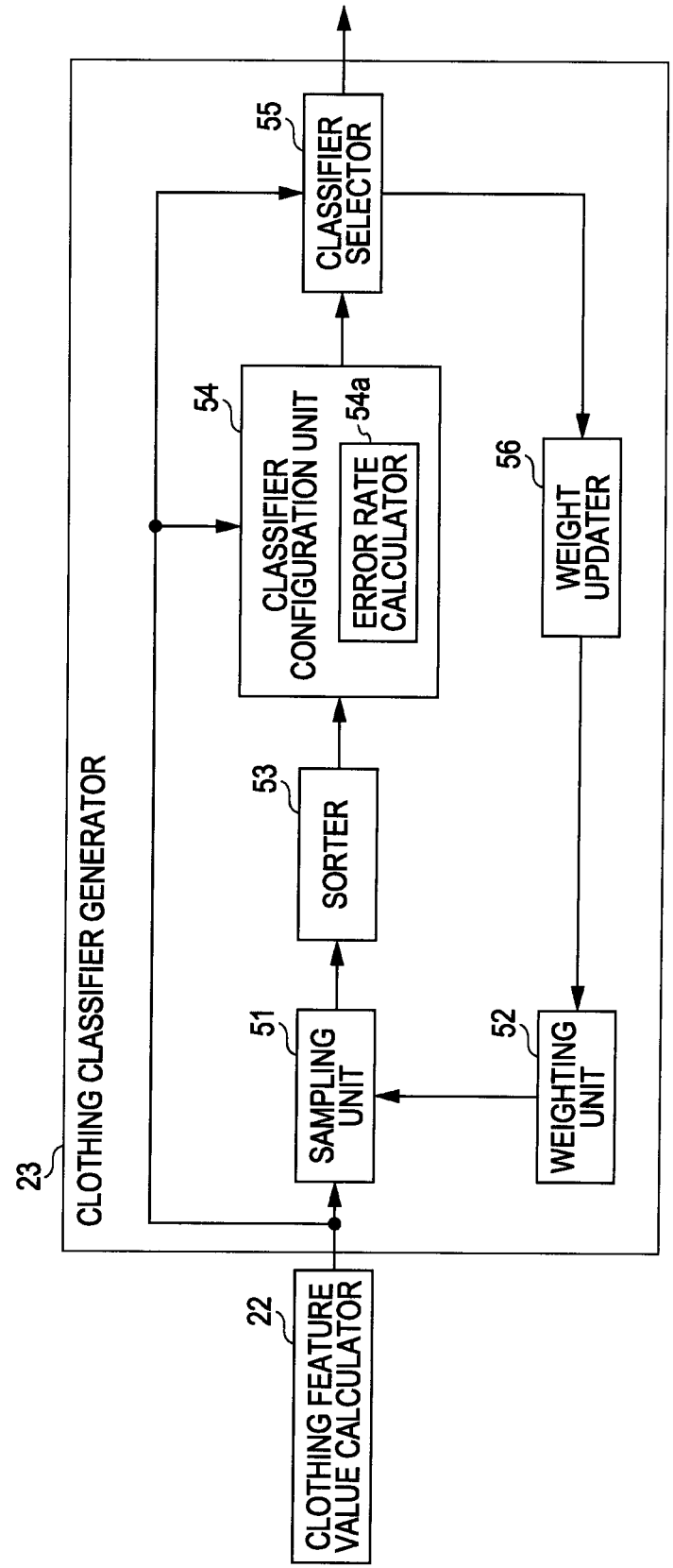
FIG. 2 illustrates an exemplary detailed configuration of a clothing classifier generator.

FIG. 2 is a block diagram illustrating a more detailed exemplary configuration of the clothing classifier generator 23 shown in FIG. 1. The clothing classifier generator 23 includes a sampling unit 51, a weighting unit 52, a sorter 53, a classifier configuration unit 54, a classifier selector 55, and a weight updater 56.

The sampling unit 51 samples M clothing feature values from the clothing feature values for pairs of clothing feature points at respectively identical positions in a plurality of learning images. Sampling is conducted for each pair of clothing feature points and according to per-learning-image weights set by the weighting unit 52. The M clothing feature values thus sampled are supplied to the sorter 53.

The sorter 53 sorts the M clothing feature values thus sampled for each pair clothing feature points in ascending or descending order, and supplies the sorted result to the classifier configuration unit 54.

On the basis of hit/miss information indicating whether or not a target object to be recognized is contained in the learning image from which a particular clothing feature value was extracted, the classifier configuration unit 54 controls an error rate calculator 54a while varying the threshold value for each of the per-pair clothing feature values sorted in ascending or descending order. The error rates are thus calculated, and threshold values are set such that the error rates are minimized (these threshold values are set as weak classifiers). In addition, the classifier configuration unit 54 supplies the error rate for each weak classifier to the classifier selector 55.

The hit/miss information (i.e., a label) indicating whether or not the target object is contained in a learning image is appended to that learning image. On the basis of the hit/miss information appended to the learning images supplied from the clothing feature value calculator 22, the classifier configuration unit 54 configures weak classifiers.

The classifier selector 55 selects the weak classifier with the minimum error rate from among the weak classifiers, updates the clothing classifier made up of the weak classifiers, and supplies clothing feature values corresponding to the final clothing classifier and each weak classifier to the ensemble classifier generator 27. In addition, the classifier selector 55 calculates a reliability factor on the basis of the error rate of the selected weak classifier, and supplies the result to the weight updater 56.

On the basis of the supplied reliability factor, the weight updater 56 re-calculates weights for each learning image, additionally normalizes and updates the weights, and supplies the updated result to the weighting unit 52. On the basis of the updated weight result supplied by the weight updater 56, the weighting unit 52 sets the weights for each learning image.

[Configuration of Contour Feature Value Calculator]

Figure 3:
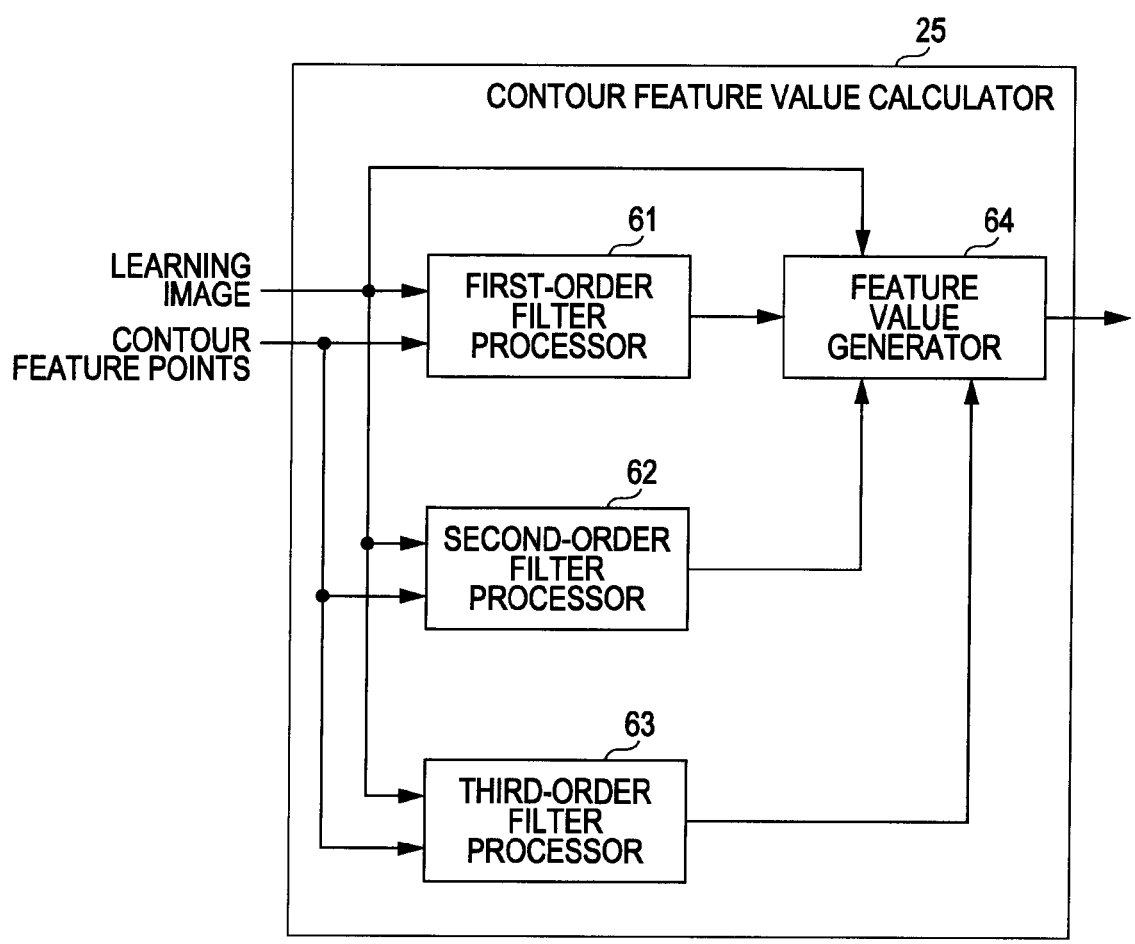
FIG. 3 illustrates an exemplary detailed configuration of a contour feature value calculator.

FIG. 3 illustrates a more detailed exemplary configuration of the contour feature value calculator 25 shown in FIG. 1. The contour feature value calculator 25 includes a first-order filter processor 61, a second-order filter processor 62, a third-order filter processor 63, and a feature value generator 64. In addition, the learning images from the contour feature point extractor 24 are respectively supplied to each component from the first-order filter processor 61 to the feature value generator 64, while the contour feature points are respectively supplied to each component from the first-order filter processor 61 to the third-order filter processor 63.

The first-order filter processor 61 extracts feature values by filtering each supplied contour feature point using a first-order derivative function $G_1$ of a Gaussian function G, and supplies the result to the feature value generator 64. Herein, the Gaussian function G and the first-order derivative function $G_1$ are given in the following Eqs. 1 and 2.

Eq. 1
$$G = e^{-\frac{x^2+y^2}{2\sigma^2}} \tag{1}$$

Eq. 2
$$G_1(\theta) = \cos(\theta)G_1(0°) + \sin(\theta)G_1(90°) \tag{2}$$

In Eq. 1, $\sigma$ represents the Gaussian width. In Eq. 2, $\theta$ represents an arbitrary angle indicating the desired direction in which to apply the filter.

For example, the first-order filter processor 61 may vary the Gaussian width $\sigma$ of the Gaussian function G among three preset values (such as Gaussian widths $\sigma_1=2$, $\sigma_2=2$, and $\sigma_3=4$, for example), and then evaluate Eq. 2 in four predetermined directions ($\theta_1$, $\theta_2$, $\theta_3$, and $\theta_4$, for example) for each Gaussian width $\sigma$.

It should be appreciated that the direction $\theta$ is not limited to four directions, and that eight directions may also be used (such as the directions obtained when dividing pi equally in eight directions). Furthermore, although the related art conducts processing using a plurality of Gaussian widths as described above, just a single Gaussian width may be prepared for the present embodiment, as described later. In other words, varying the Gaussian width may be omitted. Thus, although the above states that the Gaussian width σ is varied among three preset values and Eq. 2 is evaluated in four predetermined directions for each Gaussian width σ, in the present embodiment, Eq. 2 may simply be evaluated in four predetermined directions for a single Gaussian width σ that has been set.

Since the calculations for each of a plurality of Gaussian widths may be omitted, it is possible to reduce the computational complexity. The same is also true for other filters, such as the second-order filter processor 62 and the third-order filter processor 63.

The second-order filter processor 62 extracts feature values by filtering each supplied contour feature point using a second-order derivative function $G_2$ of a Gaussian function G, and supplies the result to the feature value generator 64. Eq. 3 expresses the second-order derivative function $G_2$, where θ represents an arbitrary angle.

Eq. 3

$$G_2(\theta) = k_{21}(\theta)G_2(0°) + k_{22}(\theta)G_2(60°) + k_{23}(\theta)G_2(120°) \quad (3)$$

The coefficient $k_{2i}(\theta)$ (where i=1, 2, 3) in Eq. 3 represents the function expressed by the following Eq. 4.

Eq. 4

$$k_{2i}(\theta) = \frac{1}{3}\{1 + 2\cos(2(\theta - \theta i))\} \quad (4)$$

The second-order filter processor 62 may, for example, evaluate Eq. 3 in four predetermined directions ($\theta_1$, $\theta_2$, $\theta_3$, and $\theta_4$, for example) for a predetermined Gaussian width σ of the Gaussian function G.

The third-order filter processor 63 extracts feature values by filtering each supplied contour feature point using a third-order derivative function $G_3$ of a Gaussian function G, and supplies the result to the feature value generator 64. Eq. 5 expresses the third-order derivative function $G_3$, where θ represents an arbitrary angle.

Eq. 5

$$G_3(\theta) = k_{31}(\theta)G_3(0°) + k_{32}(\theta)G_3(45°) + k_{33}(\theta)G_3(90°) + k_{34}(\theta)G_3(135°) \quad (5)$$

The coefficient $k_{3i}(\theta)$ (where i=1, 2, 3) in Eq. 5 represents the function expressed by the following Eq. 6.

Eq. 6

$$k_{3i}(\theta) = \frac{1}{4}\{2\cos(\theta - \theta i) + 2\cos(3(\theta - \theta i))\} \quad (6)$$

The third-order filter processor 63 may, for example, evaluate Eq. 5 in four predetermined directions ($\theta_1$, $\theta_2$, $\theta_3$, and $\theta_4$, for example) for a predetermined Gaussian width σ of the Gaussian function G.

The feature value generator 64 receives the feature values for each contour feature point, calculated in four directions and respectively supplied from the first-order filter processor 61, the second-order filter processor 62, and the third-order filter processor 63. The supplied total of 12 feature values (four directions in three orders) are collectively taken to be the contour feature value for each contour feature point.

In addition, since each filter processor is supplied with a plurality of images at different resolutions from the image pyramid generator 20, feature values from each image calculated in the four directions θ for each contour feature point are supplied to the feature value generator 64. The supplied feature values depend on the number of images generated by the image pyramid generator 20. For example, when eight images from level 1 to level 8 are generated, eight sets of feature values calculated in the four directions θ for each contour feature point are supplied.

The feature value generator 64 supplies both the generated contour feature value and the supplied learning images to the contour classifier generator 26.

Thus, in the contour feature value calculator 25, derivatives of a Gaussian function are taken to obtain filters (i.e., basis functions) with directional (θ) selectivity. The obtained filters are used to extract feature values (i.e., contours) that differ for each order of the derivative, and which are taken to be the contour feature values.

Figure 4:
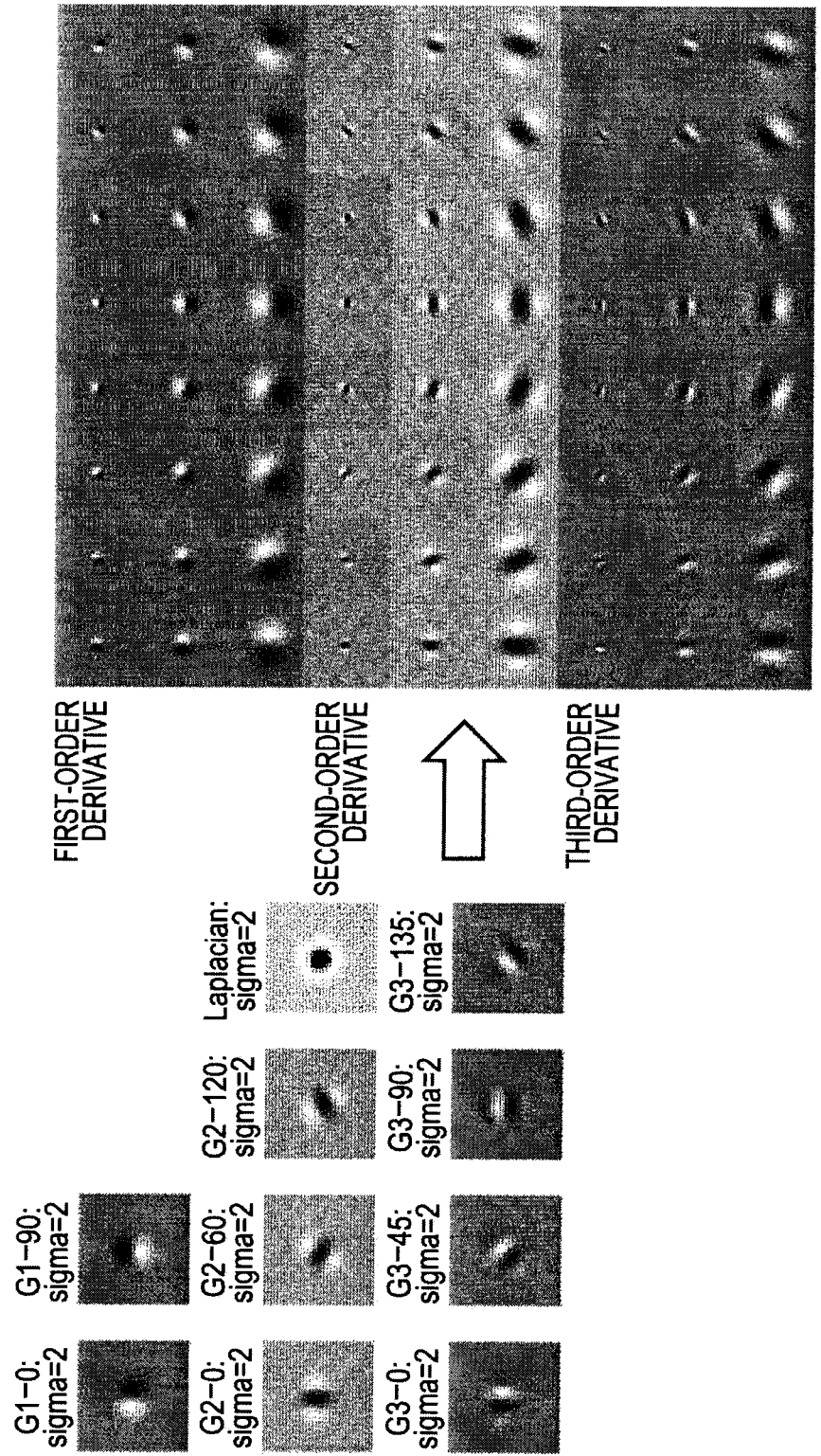
FIG. 4 explains steerable filters.

As shown in FIG. 4, when steerable filters are used for contour feature value extraction, if filters are prepared having different directions θ and Gaussian widths σ, then a linear combination of these filters can be used to create a filter of arbitrary direction θ, or in other words, the derivative functions $G_n$ (wherein n=1, 2, 3) of the Gaussian function G.

The topmost images in the horizontal rows shown on the right side of FIG. 4 represent the first-order derivative function $G_1(\theta)$ for a Gaussian width σ equal to 1, illustrating θ values of 0, ⅛*pi, ⅔*pi, ⅜*pi, ⅘*pi, ⅝*pi, ⅞*pi, and ⅞*pi, in order from left to right.

Similarly, the horizontal rows shown on the right side of FIG. 4 respectively represent, in order from the second row from the top and proceeding downwards, the first-order derivative function $G_1(\theta)$ for a Gaussian width σ equal to 2, the first-order derivative function $G_1(\theta)$ for a Gaussian width σ equal to 4, the second-order derivative function $G_2(\theta)$ for a Gaussian width σ equal to 1, the second-order derivative function $G_1(\theta)$ for a Gaussian width σ equal to 2, the second-order derivative function $G_2(\theta)$ for a Gaussian width σ equal to 4, the third-order derivative function $G_3(\theta)$ for a Gaussian width σ equal to 1, the third-order derivative function $G_3(\theta)$ for a Gaussian width σ equal to 2, and the third-order derivative function $G_3(\theta)$ for a Gaussian width σ equal to 4. Furthermore, the images in each row illustrate the corresponding derivative function with θ values of 0, ⅛*pi, ⅔*pi, ⅜*pi, ⅘*pi, ⅝*pi, ⅞*pi, and ⅞*pi, in order from left to right.

For example, two filters shown on the left side of FIG. 4, the first-order derivative function $G_1(0°)$ and the first-order derivative function $G_1(90°)$, can be used to express the first-order derivative function $G_1(\theta)$ for each direction θ shown in the second row from the top on the right side of FIG. 4. Similarly, the second-order derivative functions $G_2$ on the left side of FIG. 4 can be used to express the second-order derivative function $G_2(\theta)$ for each direction θ shown in the fifth row from the top on the right side of FIG. 4. The third-order derivative functions $G_3$ on the left side of FIG. 4 can be used to express the third-order derivative function $G_3(\theta)$ for each direction θ shown in the eighth row from the top on the right side of FIG. 4. In other words, given a number of basis functions one greater than their dimensionality, a derivative function of arbitrary direction in the same dimensionality can be expressed by a linear combination of the basis functions.

Figure 5:
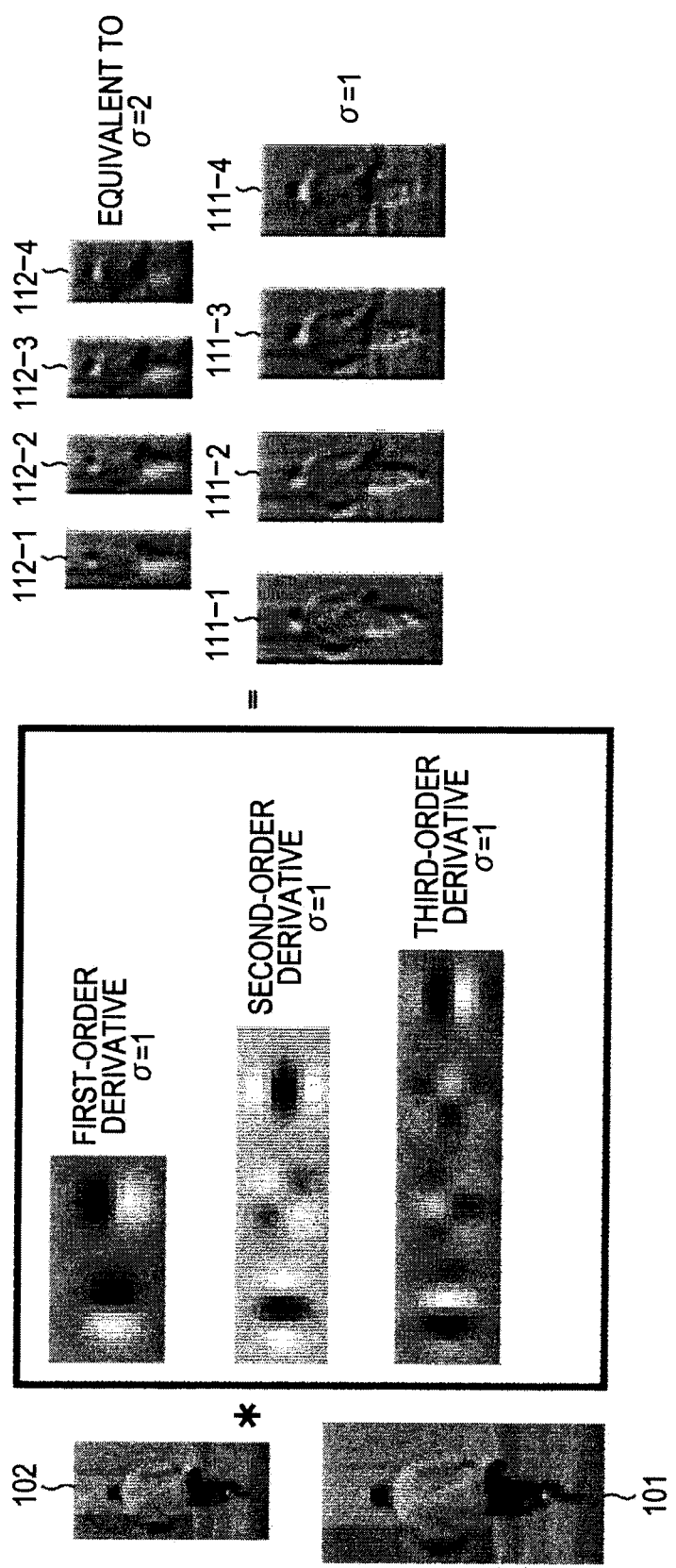
FIG. 5 illustrates the results of filtering an image.

FIG. 5 illustrates the results obtained by filtering an image depicting a human using derivative functions of a Gaussian function G. In FIG. 5, the images to be filtered is shown on the left, the filters are shown in the center, and the post-filter images are shown on the right.

The images shown on the left side of FIG. 5 are two images constituting an image pyramid, and have different resolutions. As described earlier, the image pyramid generator 20 generates images with different resolutions from levels L1 to L8, for example. On the left side of FIG. 5, the L1 image 101 and the L2 image 102 from such an image pyramid are shown by way of example.

The filters shown by way of example in the center of FIG. 5 are filters for the first-order derivative function $G_1$, the second-order derivative function $G_2$, and the third-order derivative function $G_3$, all having Gaussian widths a equal to 1. The filters shown by way of example in the center of FIG. 5 are taken from a portion of the filters shown in FIG. 4.

When filters from among those shown in the center of FIG. 5 (such as the filters for the third-order derivative function $G_3$, for example) are used to filter the images shown on the left side of FIG. 5, the images shown on the right side of FIG. 5 are generated. In other words, if the image 101 is filtered by the filters of the third-order derivative function $G_3$, then the images 111-1 to 111-4 are generated. Likewise, if the image 102 is filtered by the third-order derivative filters, then the images 112-1 to 112-4 are generated.

The images 111-1 to 111-4 have been respectively filtered using the filters of the third-order derivative function $G_3$ with a Gaussian width σ equal to 1 (σ=1). Thus, the images 111-1 to 111-4 are the images obtained when filtering with filters having Gaussian widths σ equal to 1.

Similarly, the images 112-1 to 112-4 have been respectively filtered using the filters of the third-order derivative function $G_3$ with a Gaussian width σ equal to 1 (σ=1). Thus, the images 112-1 to 112-4 are the images obtained when filtering with filters having Gaussian widths σ equal to 1.

However, the images 112-1 to 112-4 are the images resulting from filtering the images 102. The images 102 are reduced versions of the images 101. In such a case, the images 112-1 to 112-4 can be taken to be equivalent to the images generated as a result of filtering using the filters of the third-order derivative function $G_3$ with a Gaussian width σ equal to 2 (σ=2). Stated differently, the images 112-1 to 112-4 are equivalent to the images generated when filtering the image 101 using the filters of the third-order derivative function $G_3$ with a Gaussian width σ equal to 2 (σ=2).

In other words, by filtering an image pyramid, it is possible to obtain images equivalent to those obtained when filtering a single image using multiple filters with different Gaussian widths. For example, if the computational complexity and processing load involved in filtering is compared between the case of filtering a single image using multiple filters prepared at each Gaussian width versus the case of filtering an image pyramid using a single filter prepared at a single Gaussian width, the filtering of the image pyramid using a single filter exhibits a significantly decreased computational complexity and processing load.

In other words, by generating an image pyramid and filtering it at a single Gaussian width, it is possible to significantly shorten processing time. Consequently, such a technique also shortens processing time when attempting to detect a human or other target object from an image, thereby making it possible to detect a target object from an image in real-time.

In this way, the contour feature value calculator 25 generates a plurality of images equivalent to those obtained when filtering with multiple filters having different Gaussian widths, and additionally generates an image obtained by averaging the plurality of generated images. The contours of a human can be confirmed from the average image thus generated, and thus human contours are suitably extracted from the image by filtering the image using the respective filters.

The internal configuration of the contour feature value calculator 34 in the recognition apparatus 13 shown in FIG. 1 is similar to that of the contour feature value calculator 25 shown in FIG. 3.

[Learning Process]

A learning process conducted in the learning apparatus 11 will now be described. A learning image is input into the learning apparatus 11, and when instructions to generate an ensemble classifier are issued, the learning apparatus 11 initiates the learning process and generates an ensemble classifier by means of statistical learning. Hereinafter, the learning process conducted by the learning apparatus 11 will be described with reference to the flowcharts shown in FIGS. 6 to 8.

In step S10, the image pyramid generator 20 generates an image pyramid from the input learning image. As described earlier, the image pyramid generator 20 generates, for example, an image pyramid having eight resolution layers from levels L1 to L8. The generated images are supplied to the clothing feature point extractor 21 and the contour feature point extractor 24. The clothing feature point extractor 21 and the contour feature point extractor 24 respectively set one image from the supplied image pyramid (i.e., the plurality of images having different resolutions) as the learning image to be processed, and execute the processing in steps S11 and thereafter. The processing in steps S11 and thereafter is repeatedly executed for each image in the plurality of images.

In step S11, the clothing feature point extractor 21 extracts clothing feature points from the supplied learning image, and then supplies the both the extracted clothing feature points and the learning image to the clothing feature value calculator 22.

In step S12, the clothing feature value calculator 22 uses the clothing feature points and the learning image supplied from the clothing feature point extractor 21 as a basis for pairing each clothing feature point with another clothing feature point.

In step S13, the clothing feature value calculator 22 calculates a clothing feature value for each pair of clothing feature points paired in step S12. The clothing feature values thus obtained are supplied to the clothing classifier generator 23.

Figure 9:
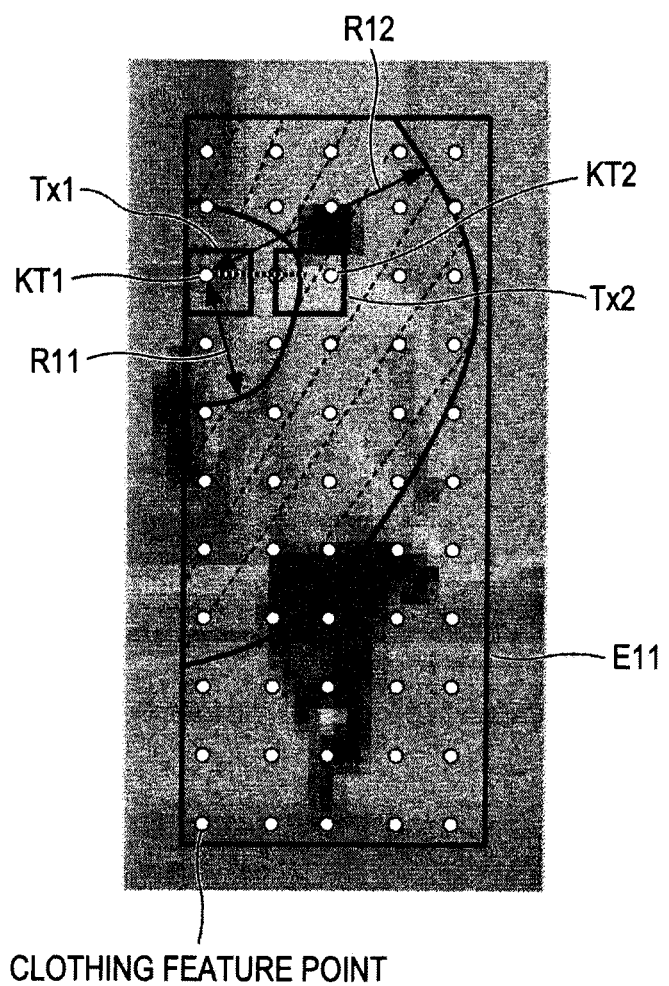
FIG. 9 explains clothing feature point extraction.

For example, when the learning image shown in FIG. 9 is input into the clothing feature point extractor 21, the clothing feature point extractor 21 extracts clothing feature points from the learning image on the basis of a predetermined margin and sampling skip number. The circles on the learning image shown in FIG. 9 indicate the pixels taken as clothing feature points.

Herein, the margin refers to a number of pixels in the learning image that starts from the edge of the learning image and ends at the clothing feature point extraction region. The sampling skip number refers to an interval between two pixels in the learning image set as clothing feature points.

Consequently, when the margin is 5 pixels and the sampling skip number is 5 pixels, for example, the clothing feature point extractor 21 excludes from the learning image the region made up of pixels positioned within 5 pixels from the edge of the learning image, and sets the remaining region E11 as the target for clothing feature point extraction. Subsequently, the clothing feature point extractor 21 extracts pixels positioned 5 pixels apart from each other as the clothing feature points. In other words, in FIG. 9, the distance between adjacent clothing feature points is 5 pixels in both the vertical and horizontal directions, and each clothing feature point is a pixel within the region E11.

Next, the clothing feature value calculator 22 pairs each clothing feature point on the basis of a predetermined minimum radius and maximum radius. For example, for a minimum radius of R11 and a maximum radius of R12, when a given clothing feature point KT1 is targeted, the clothing feature value calculator 22 respectively pairs the clothing feature point KT1 with each of the clothing feature points whose distance from the clothing feature point KT1 is not less than the minimum radius R11 and not more than the maximum radius R12.

For example, in the case where there exist N clothing feature points whose distances from the clothing feature point KT1 are not less than the minimum radius R11 and not more than the maximum radius R12, N pairs are clothing feature points are obtained. The clothing feature value calculator 22 thus pairs all of the clothing feature points with other clothing feature points.

In addition, for each pair of clothing feature points obtained by the above pairing, the clothing feature value calculator 22 calculates the texture distance between regions of predetermined shape and size respectively centered about the clothing feature points constituting the pair. This calculated texture distance is taken to be the clothing feature value.

For example, consider the case of calculating the clothing feature value by taking the sum of absolute differences (SAD) for the pair made up of the clothing feature points KT1 and KT2 shown in FIG. 9. In this case, the clothing feature value calculator 22 defines a region TX1 to be a predetermined region centered about the clothing feature point KT1, and a region TX2 to be a region of the same size as the region TX1 and centered about the clothing feature point KT2. Subsequently, the clothing feature value calculator 22 calculates the sum of the absolute values of the differences between the pixel values of the pixels within the region TX1, and the pixel values of the corresponding pixels within the region TX2. The sum of the absolute differences thus calculated is taken to be the clothing feature value.

It should be appreciated that the clothing feature value is not limited to being the SSD, and may also be a value such as the sum of squared differences (SSD), or a normalized correlation.

In this way, the clothing feature value calculator 22 calculates a clothing feature value for each pair of clothing feature points extracted from the learning image. More specifically, a plurality of learning images are input into the learning apparatus 11, made up of several learning images containing the target object, and several learning images not containing the target object. Subsequently, clothing feature points are extracted and clothing feature values are calculated for each input learning image.

Figure 10:
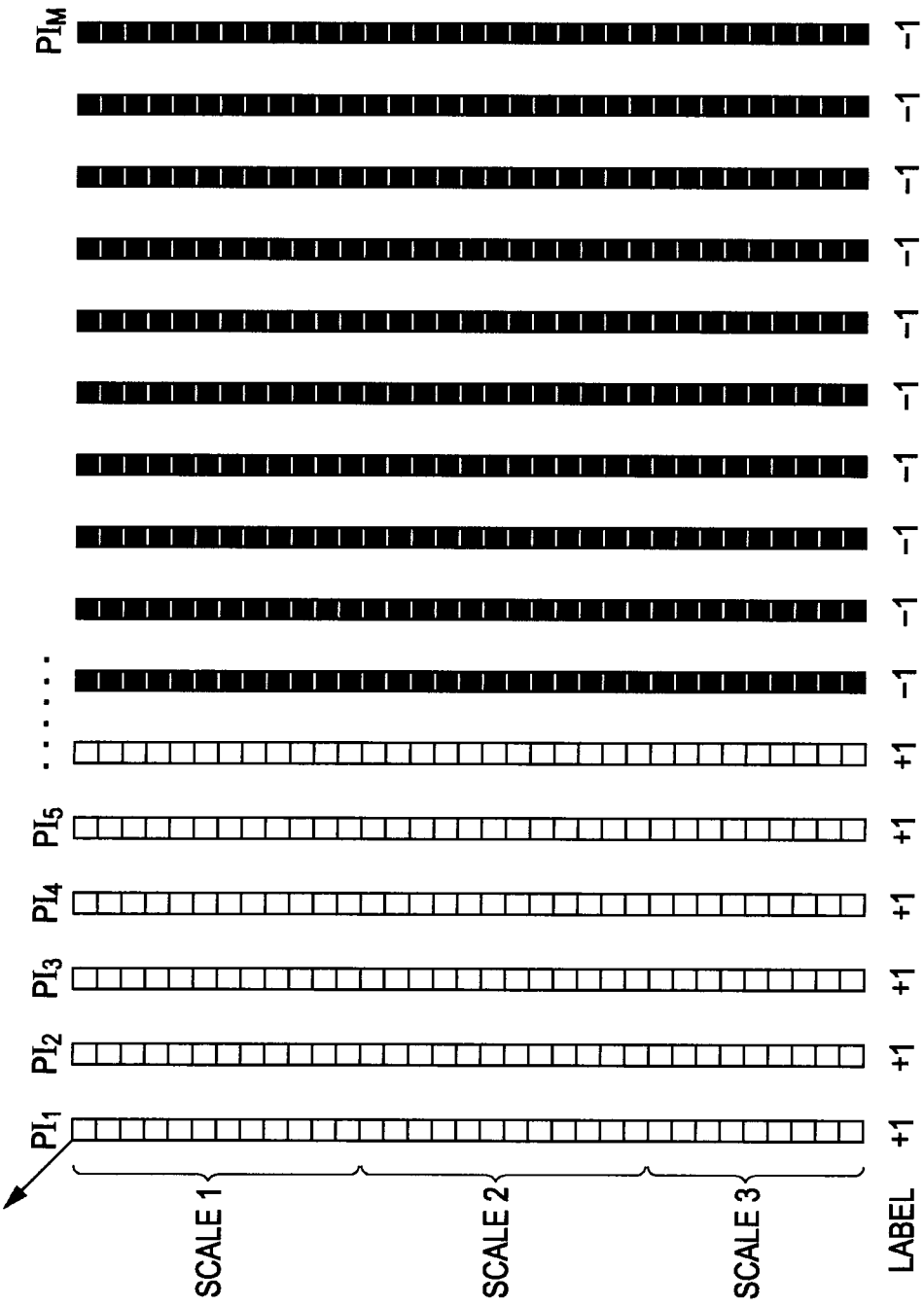
FIG. 10 explains clothing feature values.

For example, consider the case wherein M learning images $PI_1$ to $PI_M$ (where M is a natural number) are input into the learning apparatus 11. As shown in FIG. 10, a clothing feature value is obtained for each pair of clothing feature points in the M learning images $PI_i$ (where $1 \le i \le M$).

In FIG. 10, a single square represents the clothing feature value for a single pair of clothing feature points. In addition, the columns of vertically-arranged squares in FIG. 10 represent sequences of clothing feature values obtained from the learning images $PI_i$ (wherein $1 \le i \le M$). Each sequence contains a number of clothing feature values equal to the number of pairs of clothing feature points obtained from the given learning image $PI_i$. In other words, the number of pairs of clothing feature points obtained from the learning image $PI_i$ becomes the dimensionality of the clothing feature value for that learning image $PI_i$.

The learning images herein refer to the respective images in an image pyramid, as described earlier. FIG. 10 illustrates the case wherein a three-image pyramid is generated from a single image, and wherein each of the three images in the pyramid is respectively processed. In other words, FIG. 10 illustrates the simple case of feature value vectors during learning when the number of multi-resolution levels has been set to 3.

In FIG. 10, scale refers to a scale coefficient. A scale coefficient is a reduction ratio indicating how the image size is scaled in the next level. For example, scale 1 indicates a scale coefficient of 1. A single column in FIG. 10 contains a number of clothing feature values equal to the number of pairs of clothing feature points respectively obtained from the plurality of learning images $PI_i$ constituting the image pyramid.

In addition, at the bottom of the columns of clothing feature values for each learning image $PI_i$ in FIG. 10, labels (i.e. hit/miss information) are shown indicating whether or not the target object is contained in that learning image $PI_i$. For example, label "+1" shown at the bottom of the column of clothing feature values for the learning image $PI_1$ indicates that the target object is contained in the learning image $PI_1$, while the label "−1" shown at the bottom of the column of clothing feature values for the learning image $PI_M$ indicates that the target object is not contained in the learning image $PI_M$.

Figure 6:
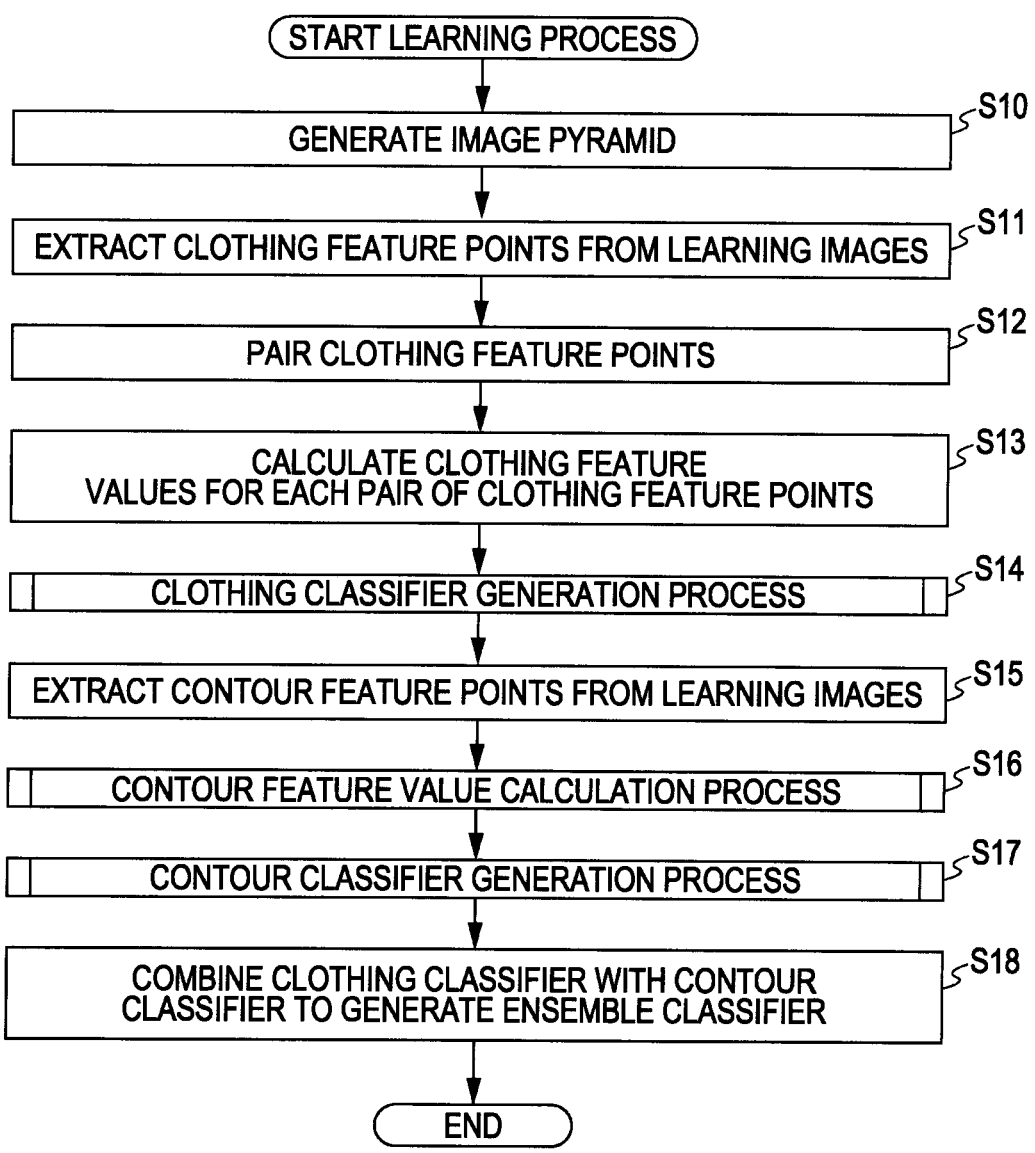
FIG. 6 is a flowchart explaining learning processing.

Returning now to the flowchart in FIG. 6, in step S13, the clothing feature values are calculated, and then in step S14, the clothing classifier generator 23 conducts the clothing classifier generation process to generate a clothing classifier.

Figure 7:
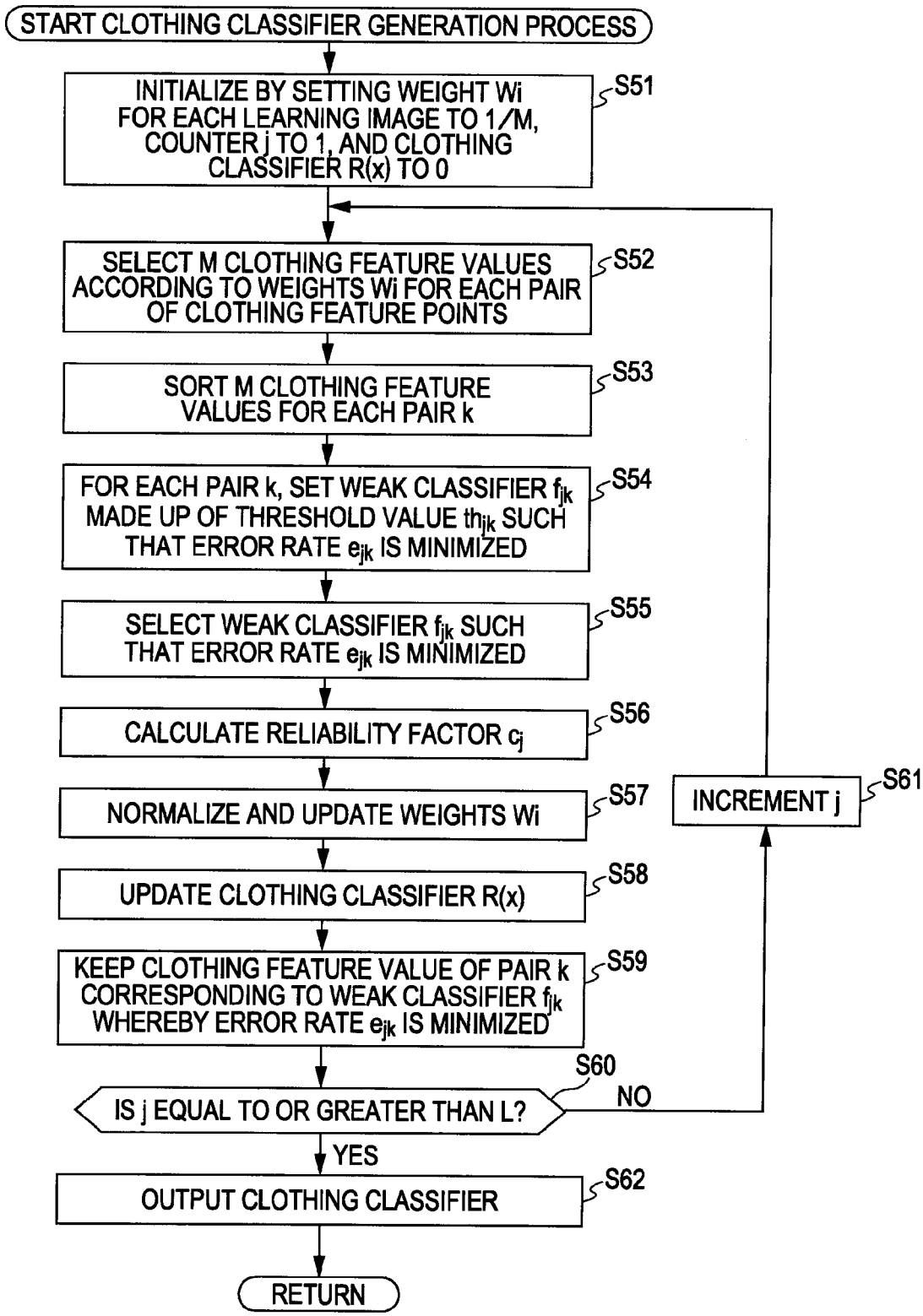
FIG. 7 is a flowchart explaining clothing classifier generation processing.

The clothing classifier generation process corresponding to step S14 will now be described with reference to the flowchart in FIG. 7.

In step S51, the weighting unit 52 initializes, for example, all of the weights Wi for each learning image $PI_i$ (where $1 \le i \le M$) shown in FIG. 10 to 1/M, while the classifier selector 55 respectively initializes a counter j to 1 and a clothing classifier R(x) made up of a sum of weak classifiers to 0.

Herein, i is a number for identifying the learning images $PI_i$ shown in FIG. 10, where $1 \le i \le M$. As a result of the processing in step S51, the weights Wi for all learning images $PI_i$ are all set to the same normalized weight (1/M). Additionally, the counter j is a number indicating a predetermined count for updating the clothing classifier R(x).

In step S52, the sampling unit 51 selects M clothing feature values for each pair of clothing feature points according to the weights of the learning images $PI_i$ and from among the clothing feature values for the clothing feature points at the same respective positions in the plurality of learning images $PI_i$. The M clothing feature values thus selected are supplied to the sorter 53.

Figure 11:
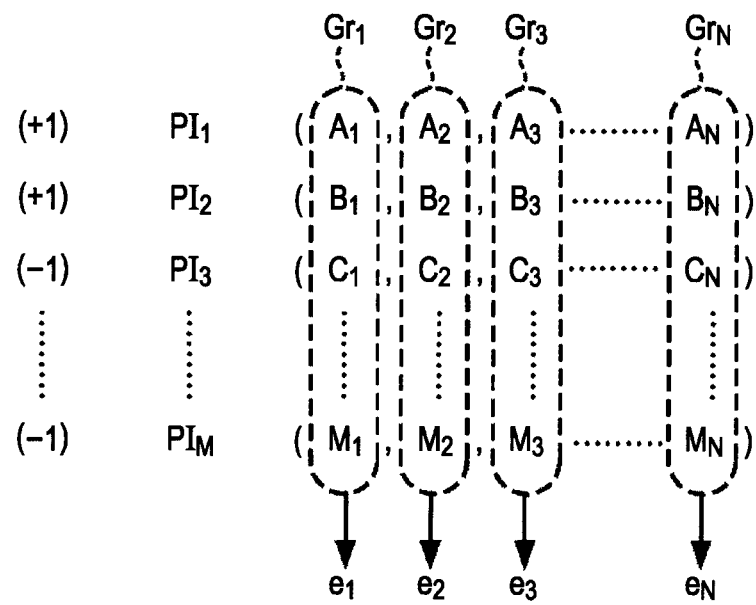
FIG. 11 explains clothing feature value sampling on a per-pair basis of clothing feature points.

For example, consider the case wherein clothing feature values from the M learning images from $PI_1$ to $PI_M$ are supplied from the clothing feature value calculator 22 to the sampling unit 51, as shown in FIG. 11. In FIG. 11, the clothing feature values obtained from the learning images $PI_i$ (wherein $1 \le i \le M$) are arranged in the horizontal direction. The numbers "+1" and "−1" shown to the left of the letters $PI_i$ representing the learning images indicate the labels (i.e., hit/miss information) appended to each corresponding learning image $PI_i$.

In other words, the sequence $(A_1, A_2, A_3, \ldots, A_N)$ arranged horizontally in the topmost row of FIG. 11 represents the respective clothing feature values for each pair of clothing feature points in the learning image $PI_1$. The number "+1" to the left of the text "$PI_1$" indicating the learning image $PI_1$ in FIG. 11 represents a label indicating that the target object is contained in the learning image $PI_1$.

Similarly, the sequence ($B_1$, $B_2$, $B_3$, . . . , $B_N$) arranged horizontally in the second row from the top of FIG. 11 represents the respective clothing feature values for each pair of clothing feature points in the learning image $PI_2$. The number "+1" to the left of the text "$PI_2$" indicating the learning image $PI_2$ in FIG. 11 represents a label indicating that the target object is contained in the learning image $PI_2$.

The sequence ($C_1$, $C_2$, $C_3$, . . . , $C_N$) arranged horizontally in the third row from the top of FIG. 11 represents the respective clothing feature values for each pair of clothing feature points in the learning image $PI_3$. The number "−1" to the left of the text "$PI_3$" in FIG. 11 represents a label indicating that the target object is not contained in the learning image $PI_3$. Furthermore, the sequence ($M_1$, $M_2$, $M_3$, . . . , $M_N$) arranged horizontally in the Mth row from the top of FIG. 11 represents the respective clothing feature values for each pair of clothing feature points in the learning image $PI_M$. The number "−1" to the left of the text "$PI_M$" in FIG. 11 represents a label indicating that the target object is not contained in the learning image $PI_M$.

Thus, in the example shown in FIG. 11, respective clothing feature values for N pairs of clothing feature points are obtained from a single learning image $PI_i$. Furthermore, in FIG. 11, the M clothing feature values from $A_i$ to $M_i$ (where $1 \le i \le M$) arranged vertically form a single group $Gr_k$. The clothing feature values belonging to a given group $Gr_k$ are the clothing feature values for the pairs of clothing feature points at the same position in each learning image $PI_i$.

For example, the group $Gr_1$ contains the vertically arranged clothing feature values from $A_1$ to $M_1$. The clothing feature value $A_1$ is calculated for a pair of clothing feature points in the learning $PI_1$. These two clothing feature points lie at the same positions on the learning image as the clothing feature points for the other clothing feature values belonging to the group $Gr_1$, such as the pair of clothing feature points in the learning image $PI_M$ from which the clothing feature value $M_1$ is calculated. Hereinafter, when a pair of clothing feature points in a particular learning image $PI_i$ is given, the pair will be designated as the pair k, indicating that a clothing feature value belonging to the group $Gr_k$ (where $1 \le k \le N$).

When clothing feature values for each learning image $PI_i$ shown in FIG. 11 are supplied to the sampling unit 51, the sampling unit 51 selects by lottery M clothing feature values for each pair k (i.e., for each group $Gr_k$) from the clothing feature values belonging to that group, and in accordance with the weights Wi of the learning images $PI_i$. For example, the sampling unit 51 may select M clothing feature values from the clothing feature values from $A_1$ to $M_1$ belonging to the $Gr_1$, in accordance with the weights Wi. Thus, in the first process herein, all clothing feature values are selected in each group $Gr_k$. Obviously, the same clothing feature values may also be selected multiple times in practice.

The weights Wi may also be used for calculating error for each pair of clothing feature points. In this case, error is calculated by multiplying the error values by data weighting coefficients (i.e., the weights Wi).

In step S53, the sorter 53 sorts the M clothing values selected for each of the N groups $Gr_k$ (i.e., for each pair k) in ascending or descending order, and supplies the result to the classifier configuration unit 54. For example, the M clothing feature values selected from the clothing feature values belonging to the group $Gr_1$ in FIG. 11 are sorted in order.

In step S54, the classifier configuration unit 54 controls the error rate calculator 54a while varying a threshold value for each group $Gr_k$ (i.e., for each pair k of clothing feature points), on the basis of the hit/miss information (i.e., labels) appended to the learning images supplied from the clothing feature value calculator 22. By means of such control, the classifier configuration unit 54 calculates an error rate $e_{jk}$ as shown in Eq. 7 given below, and sets the threshold value such that the error rate $e_{jk}$ is minimized.

Herein, the threshold value $th_{jk}$ for each pair k of clothing feature points becomes a single weak classifier $f_{jk}$. The classifier configuration unit 54. The classifier configuration unit 54 supplies the error rate $e_{jk}$ for each weak classifier $f_{jk}$ to the classifier selector 55. In other words, for each of the N pairs k, N weak classifiers $f_{jk}$ are respectively set, and an error rate $e_{jk}$ is calculated for each of the N weak classifiers $f_{jk}$. Herein, the weak classifiers $f_{jk}$ are functions that output +1 when the target object for recognition is present, and −1 when the target object for recognition is not present.

Figure 12:
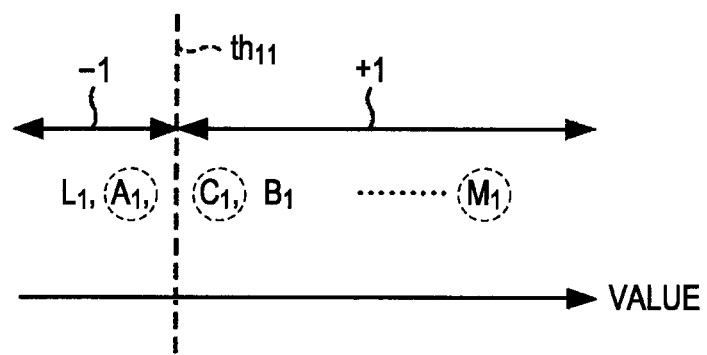
FIG. 12 explains weak classifier configuration.

For example, when j=1 and the clothing feature values $L_1$, $A_1$, $C_1$, $B_1$, . . . , $M_1$ for the pair k=1 of clothing feature points are arranged in ascending or descending order as shown in FIG. 12, the threshold value $th_{11}$ is set between the clothing feature values $A_1$ and $C_1$. In the range of values less than the threshold value $th_{11}$ (i.e., the range indicated by −1), the target object for recognition is not recognized, while in the range of values greater than the threshold value $th_{11}$ (i.e., the range indicated by +1), the target object for recognition is recognized. In this case, the clothing feature value $A_1$ circled by a broken line in FIG. 12 is a clothing feature value from a learning image containing the target object for recognition, and thus the clothing feature value $A_1$ is taken to be an error. In contrast, the clothing feature values $C_1$ and $M_1$ are clothing feature values from learning images not containing the target object for recognition, and thus the clothing feature values $C_1$ and $M_1$ are also taken to be errors.

In the example shown in FIG. 12, the threshold value $th_{11}$ is set such that the error rate $e_{jk}$ is minimized. For example, when the threshold value $th_{11}$ shown in FIG. 12 is not positioned such that the error rate $e_{jk}$ is minimized, the classifier configuration unit 54 varies the position of the threshold value $th_{11}$, and while checking the error rate $e_{jk}$ at each position, searches for the position of the threshold value $th_{11}$ where the error rate $e_{jk}$ is minimized. Once found, this position is taken to be the position of the threshold value $th_{11}$.

As shown in the following Eq. 7, the error rate calculator 54a uses the hit/miss information (i.e., labels) of the learning images as a basis for calculating the error rate $e_{jk}$ by adding together the weights Wi of the learning images from which the clothing feature values taken to be errors were extracted.

Eq. 7

$$e_{jk} = E_w[1_{(y \ne f_{jk})}] \tag{7}$$

Herein, $y \ne f_{jk}$ represents the parameter whereby a pair k of clothing feature points becomes an error, while $E_w$ indicates that the weights in the error-producing pairs k are to be added together.

In step S55, the classifier selector 55 uses the N error rate $e_{jk}$ for each pair k supplied from the classifier configuration unit 54 as a basis for selecting, from among the N weak classifiers $f_{jk}$, a weak classifier $f_{jk}$ such that the error rate $e_{jk}$ is minimized. The classifier selector 55 then acquires the selected weak classifier $f_{jk}$ from the classifier configuration unit 54.

In step S56, the classifier selector 55 uses the error rate $e_{jk}$ of the selected weak classifier $f_{jk}$ as a basis for calculating the reliability factor $c_j$ shown in the following Eq. 8. The calculated result is supplied to the weight updater 56.

Eq. 8

$$c_j = \log((1-e_j)/e_j) \qquad (8)$$

In Eq. 8, $e_j$ represents the error rate $e_{jk}$ of the weak classifier $f_{jk}$ selected from among all error rates $e_{jk}$. In other words, $e_j$ represents the minimum $e_{jk}$ among the N error rates $e_{jk}$. Hereinafter, the weak classifier for the pair k selected in step S55 will be referred to as $f_j$, and the error rate $e_{jk}$ of this weak classifier $f_j$ will be referred to as $e_j$.

In step S57, the weight updater 56 evaluates the following Eq. 9 on the basis of the supplied reliability factor $c_j$, thereby recalculating the weights Wi for each learning image $PI_i$, while additionally normalizing and updating all weights Wi. The updated results are supplied to the weighting unit 52. On the basis of updated weight results supplied by the weight updater 56, the weighting unit 52 sets the weights for each learning image.

Eq. 9

$$w_i = w_i \exp[-c_j 1_{(y \neq f_j)}], i = 1, 2, \ldots N \qquad (9)$$

Eq. 9 demonstrates that the weights Wi increase for learning images that contain error-producing clothing feature values.

In step S58, the classifier selector 55 uses the newly calculated weak classifiers $f_j$ to update the stored clothing classifier R(x). In other words, the classifier selector 55 updates the clothing classifier R(x) by evaluating the following Eq. 10.

Eq. 10

$$R(x) = R'(x) + c_j \times f_j(x) \qquad (10)$$

In Eq. 10, R'(x) represents the pre-update clothing classifier being stored by the classifier selector 55, while $f_j(x)$ represents the newly calculated weak classifiers $f_j$. In other words, the classifier selector 55 updates the clothing classifier by first taking the stored classifier, and adding to it the newly calculated weak classifier that has been weighted by multiplication with the reliability factor $c_j$.

In step S59, the classifier selector 55 takes the clothing feature value for the pair k of clothing feature points corresponding to the weak classifier $f_{jk}$ where the error rate $e_{jk}$ is minimized, and stores this clothing feature value as the classification feature value.

In step S60, the classifier selector 55 determines whether or not the counter j is equal to or greater than L. If it is determined in step S60 that the counter j is not equal to or greater than L, then in step S61, the classifier selector 55 increments the counter j. Subsequently, the process returns to step S52, and the above processing is repeated.

In other words, using the newly-set weights Wi for each learning image, new weak classifiers $f_{jk}$ are set for the N pairs k, and from these weak classifiers $f_{jk}$ a single weak classifier $f_{jk}$ is selected such that the error rate $e_{jk}$ is minimized. The clothing classifier is then updated by the selected weak classifier $f_{jk}$.

In contrast, if it is determined in step S60 that the counter j is equal to or greater than L, then in step S62, the classifier selector 55 outputs the stored clothing classifier and classification feature value to the ensemble classifier generator 27. Subsequently, the process proceeds to step S15 shown in FIG. 6.

As a result of the above process, a clothing classifier made up of L weak classifiers $f_j$ (1≤j≤L) with comparatively low error rates is supplied to the ensemble classifier generator 27, while in addition, the clothing feature values for each pair k of clothing feature points to be used with each respective weak classifier $f_j$ are also supplied to the ensemble classifier generator 27. Herein, L is taken to be less than N.

The clothing classifier from Eq. 10 is used to generate a classifier (i.e., a function) such that, when a clothing feature value is substituted in, a value of +1 is output when the clothing classifier is positive, and −1 is output when the clothing classifier is negative. Thus, this classifier is a function that outputs a yes or no regarding the target object to be recognized, determined by majority rule of the L weak classifiers. This learning process described with reference to the flowchart in FIG. 7, wherein weak classifiers are repeatedly weighted and summed to generate a classifier, is referred to as the discrete Adaboost algorithm.

In other words, as a result of the above clothing classifier generation process, processing to calculate weak classifiers and error rates for each pair of clothing feature points is repeated such that the weights of the clothing feature values for the learning images gradually increase with high error rates, and decrease with low error rates. Consequently, in the repeated processing (i.e., steps S52 to S61), when a clothing feature value is selected for setting a weak classifier (i.e., the clothing feature value selected in step S52), clothing feature values with high error rates become more readily selected over time. Learning is thus repeated with clothing feature values for which recognition is difficult being selected more often with increasing repetitions. For this reason, the clothing feature values in the learning image for which recognition is difficult become selected more often, thereby making it ultimately possible to increase the recognition rate.

Furthermore, in the repeated processing (i.e., steps S52 to S61), the classifier selector 55 selects the weak classifier corresponding to the pair with the lowest error rate. Thus, by repeating the learning process, the weak classifiers selected and added to the clothing classifier are for the pairs of clothing feature points with the highest reliability factors, and with each repetition a weak classifier with high accuracy is successively calculated.

Moreover, the clothing classifier is a classifier that uses the clothing feature values to determine whether or not an image contains a human set as the target object. The pairs of clothing feature points corresponding to the clothing feature values substituted into each weak classifier constituting the clothing classifier are thus the pairs best suited, from among all pairs of clothing feature points, to detect the target object from the input image.

Figure 13:
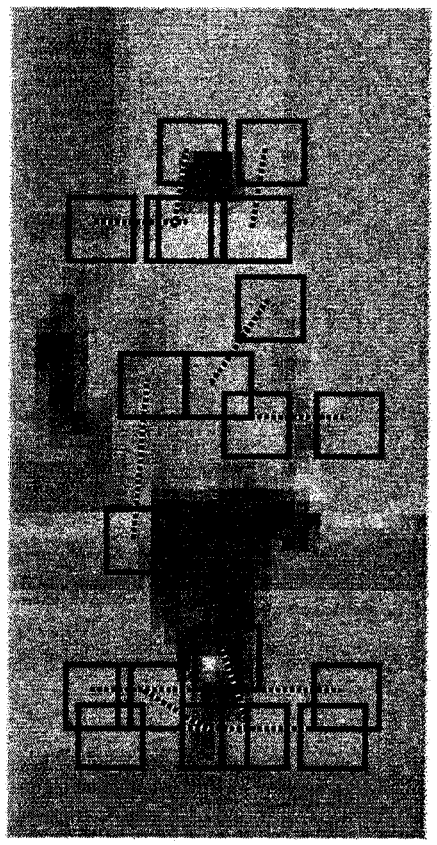
FIG. 13 explains clothing feature point pairs.

For example, in FIG. 13, the pairs corresponding to the clothing feature values substituted into the clothing classifier are the pairs of clothing feature points surrounding the human in the image set as the target object. In FIG. 13, each straight, broken line connects two clothing feature points forming a pair, while the squares centered about the endpoints of each line represent the texture areas used when calculating the clothing feature values.

In the example shown in FIG. 13, there exists a pair for which the texture distance (i.e., the clothing feature value) decreases, being made up of two clothing feature points on the upper-body clothing worn by the human in the image. There also exists a pair for which the clothing feature value increases, being made up of a clothing feature point on the person's clothing, and a clothing feature point on the background rather than the person. The example shown in FIG. 13 thus demonstrates how pairs such as the above are selected.

Returning now to the flowchart in FIG. 6, in step S15, the contour feature point extractor 24 extracts contour feature points from the input learning image.

Figure 14A:
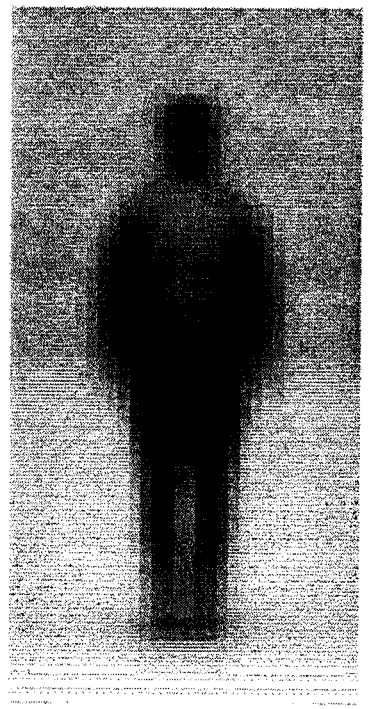
FIG. 14A explains contour feature point extraction.
Figure 14B:
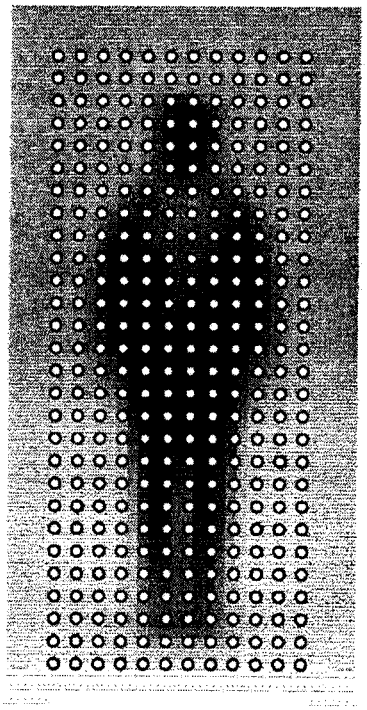
FIG. 14B explains contour feature point extraction.

For example, when the learning image shown in FIG. 14A is input into the contour feature point extractor 24, the contour feature point extractor 24 extracts contour feature points in the form of pixels arranged in predetermined intervals in the learning image, as shown in FIG. 14B. In FIG. 14B, the circles on the learning image represent the pixels taken to be the contour feature points.

The learning images shown in FIGS. 14A and 14B are made up of 32 pixels in the horizontal direction and 64 pixels in the vertical direction. The contour feature points selected as contour feature points by the contour feature point extractor 24 are spaced at two-pixel intervals in the learning image in both the horizontal and vertical directions. As a result, 12 pixels in the horizontal direction and 28 pixels in the vertical direction as shown in FIG. 14B are selected in the learning image as contour feature points, for a total of 336 (12×28) pixels.

Upon extracting the contour feature points from the learning image, the contour feature point extractor 24 supplies the extracted contour feature points and the input learning image to the contour feature value calculator 25.

In step S16, the contour feature value calculator 25 conducts a contour feature value calculation process, wherein a contour feature value is calculated for each contour feature point on the basis of the contour feature points and the learning image supplied from the contour feature point extractor 24.

Figure 8:
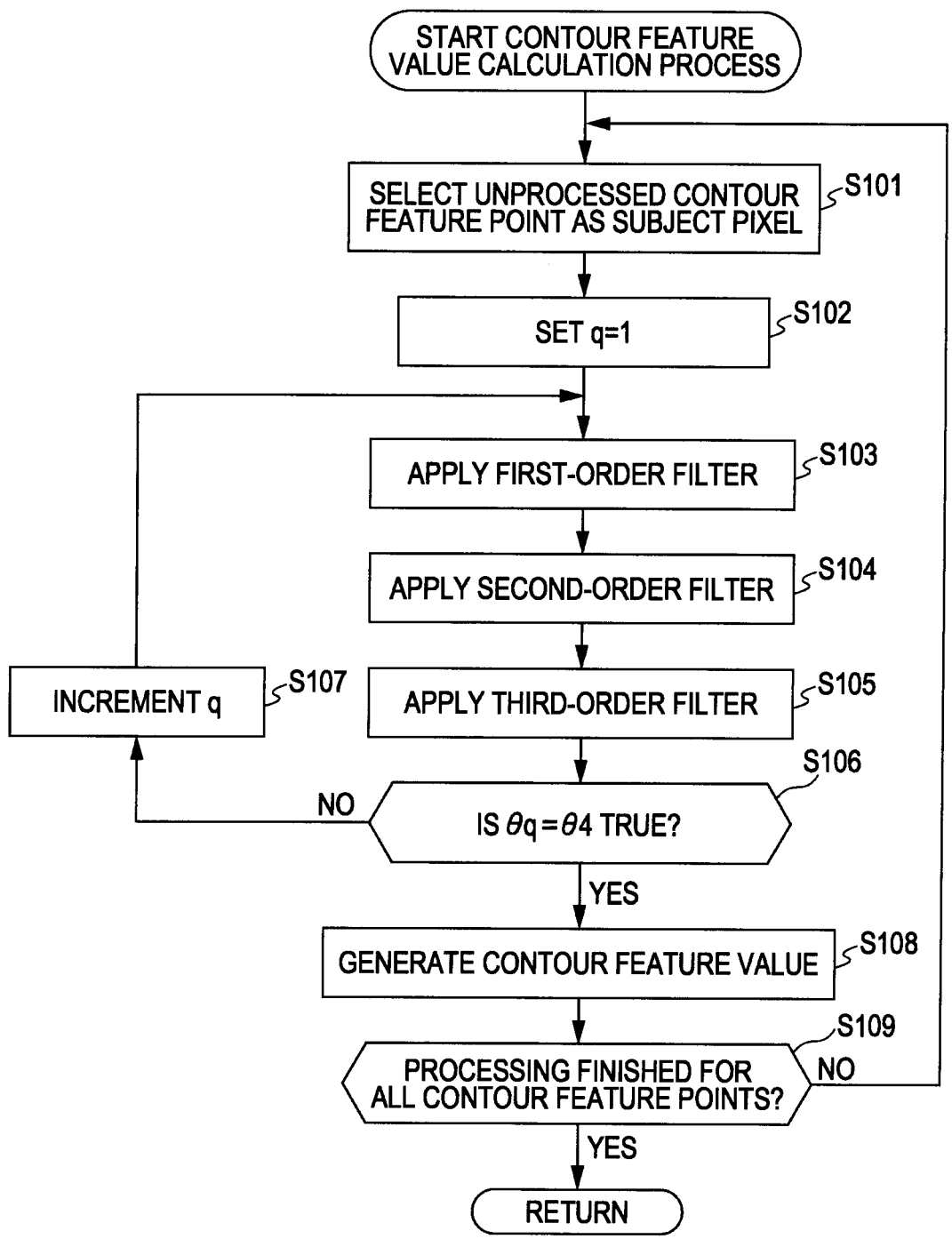
FIG. 8 is a flowchart explaining contour feature value calculation processing.

The contour feature value calculation process corresponding to step S16 will now be described with reference to the flowchart shown in FIG. 8.

In step S101, the contour feature value calculator 25 selects, or more specifically, the first-order filter processor 61, the second-order filter processor 62, and the third-order filter processor 63 of the contour feature value calculator 25 respectively select, a subject pixel in the form of a single unprocessed contour feature point from among the contour feature points supplied from the contour feature point extractor 24.

In step S102, the contour feature value calculator 25 sets a counter q indicating the direction $\theta_q$ to 1. In so doing, the direction $\theta_q$ is set to $\theta_1$.

In step S103, the first-order filter processor 61 conducts first-order filtering. In other words, on the basis of the pixel value of the subject pixel to be processed, the first-order filter processor 61 evaluates Eq. 2, setting the Gaussian width σ to 1 (σ=1) and the direction to $\theta_q$. The filtered result is supplied to the feature value generator 64. In other words, Eq. 2 is evaluated with the direction θ set to $\theta_q$, and a contour is extracted.

It should be appreciated that while the above states that the Gaussian width σ is set to 1 (σ=1), in the case of the present embodiment, the Gaussian width is fixed at σ=1 (i.e., a filter of one Gaussian width is configured in advance). For this reason, it is possible to omit the processing to set the Gaussian width σ to 1. In other words, in the present embodiment, processing is executed in step S103 so as to evaluate Eq. 2 by applying a filter with a Gaussian width σ of 1 in a direction $\theta_q$. Hereinafter, the Gaussian width σ will continue to be described as being 1 (σ=1), but obviously the Gaussian width of the prepared filter may be a Gaussian width other than σ=1.

In step S104, the second-order filter processor 62 conducts second-order filtering. In other words, on the basis of the pixel value of the subject pixel, the second-order filter processor 62 evaluates Eq. 3 by applying a filter of Gaussian width σ=1 in the direction $\theta_q$. The filtered result is supplied to the feature value generator 64. In other words, Eq. 3 is evaluated with the direction θ set to $\theta_q$, and a contour is extracted.

In step S105, the third-order filter processor 63 conducts third-order filtering. In other words, on the basis of the pixel value of the subject pixel, the third-order filter processor 63 evaluates Eq. 5 by applying a filter of Gaussian width σ=1 in the direction $\theta_q$. The filtered result is supplied to the feature value generator 64. In other words, Eq. 5 is evaluated with the direction θ set to $\theta_q$, and a contour is extracted.

In step S106, the contour feature value calculator 25 determines whether or not the direction $\theta_q$ is $\theta_4$, or in other words, whether or not the counter q is equal to 4 (q=4). If it is determined in step S106 that the direction $\theta_q$ is not $\theta_4$, then in step S107, the contour feature value calculator 25 increments the counter q. For example, if the counter q equals 1 (q=1), the counter q is incremented to 2 (q=2), thereby setting the direction $\theta_q$ to $\theta_2$. Once the counter q has been incremented, the process returns to step S103, and the above processing is repeated.

In contrast, if it is determined in step S106 that the direction $\theta_q$ is $\theta_4$, then in step S108, the feature value generator 64 combines the calculation results (i.e., contour feature values) supplied from the first-order filter processor 61, the second-order filter processor 62, and the third-order filter processor 63 to generate a contour feature value for a single contour feature point.

The contour feature value may be calculated according to the following Eqs. 11 or 12.

Eq. 11
$$v_j = \sum_{x,y} |G_{d,\theta} \otimes I(x_i, y_i, s_i)| \tag{11}$$

Eq. 12
$$v_j = \max_{x,y} |G_{d,\theta} \otimes I(x_i, y_i, s_i)| \tag{12}$$

In Eqs. 11 and 12, $G_{d,\theta}$ is the d-th order derivative function of the Gaussian function G for an arbitrary angle θ, the same as that shown in Eq. 2. Additionally, in the term $I(x_i,y_i,s_i)$, $(x_i,y_i)$ represents the in-image coordinates of the contour feature point being processed, while $(s_i)$ represents the scale of the image being processed from among the images constituting the image pyramid.

Eq. 11 is a formula for first computing the tensor product of the contour feature values and the d-th order derivative function of the Gaussian function G for an arbitrary angle θ, and then computing the sum (Σ) of the absolute values of the result. Eq. 12 is a formula for computing the tensor product of the contour feature values and the d-th order derivative function of the Gaussian function G for an arbitrary angle θ, and then computing the maximum value (max) of the absolute values of the result.

Although Eqs. 11 and 12 are both formulas for computing a feature value, Eq. 11 is a formula for calculating local energy, while Eq. 12 is a formula for calculating the local maximum value. The meaning of these formulas will now be described.

As a result of processing like that described above, supervised statistical learning is conducted, using a function at an arbitrary angle and scale-extracted filter coefficients as feature values. In so doing, a detection classifier for detecting a human or similar target object can be generated. However, in this detection classifier, there exist feature values dependent on, for example, the clothing the person is wearing and his or her relationship with the background. Furthermore, feature value selectivity is highly non-constrained for recognition targets having significant deformation and transformation, like humans. Thus, it is desirable to conduct processing that absorbs such factors, and converts the respective feature values into invariant feature values.

The conversion from feature values dependent on the clothing a person is wearing and his or her relationship with the background to invariant feature values can be resolved by computing the absolute values of the filtered output values. By computing the absolute values, feature values close to a person's contours can be extracted. In the present embodiment, a first-order derivative function, a second-order derivative function, and additionally, a third-order derivative function are evaluated, with the respective absolute values taken from each. Thus, accuracy is significantly improved over the case of computing only the absolute values from a first-order derivative function, thereby enabling the extraction of invariant feature values.

As described above, feature value selectivity is highly non-constrained for recognition targets having significant deformation and transformation, like humans. Computation of feature values able to absorb this factor is enabled by performing position-invariant computations. For example, when the contours of a person's face are detected, the computations utilize factors such that the lengths of those contours are nearly the same regardless of the shape of the face. In other words, when focusing on a given portion of a contour, the computations regard values such as the length of that portion to be invariant, even when that portion shifts position. For example, if the contours of a person with a nearly round face changes position so as to overlap the contours of a person with a long and narrow face, then the computations regard the contours as having changed position only, while the lengths remain invariant.

Such computations involve computing the sum, as in Eq. 11. By computing the sum, the sum of the contours of a person's face is computed, for example. Alternatively, the maximum value may be computed, as in Eq. 12. By computing the maximum value, the maximum value from among those of the contours of a person's face is computed, for example.

Herein, two computations have been demonstrated: the sum and the maximum value. In other words, computation for calculating the local energy on the basis of Eq. 11 has been demonstrated, as well as computation for calculating the local maximum value on the basis of Eq. 12, as described above. In addition to these computations, computation may be conducted such that the local energy surrounding a point exhibiting a local maximum value is calculated. Such computation presumably involves taking the computational result from Eq. 12 and performing the computation in Eq. 11. Alternatively, computation may be conducted such that the maximum value near a local energy is calculated. Such computation presumably involves taking the computational result from Eq. 11 and performing the computation in Eq. 12. Although specific formulas are not given herein, feature values may be calculated with such computations.

By means of such computation, a feature value is calculated from each contour feature point. Subsequently, in step S109, the contour feature value calculator 25 determines whether or not processing has finished for all contour feature points. For example, if contour feature values have been calculated from all contour feature points supplied from the contour feature point extractor 24, then the processing is determined to be finished.

If it is determined in step S109 that processing has not finished for all contour feature points, then the process returns to step S101, and the next contour feature point is selected as the subject pixel.

In contrast, if it is determined in step S109 that processing has finished for all contour feature points, then the feature value generator 64 supplies both the learning image supplied from the contour feature point extractor 24 and the generated contour feature values for each contour feature point to the contour classifier generator 26. Subsequently, the process proceeds to step S17 in FIG. 6.

It should be appreciated that the extraction of contour feature values from the learning image is not limited to being conducted with a steerable filter, and a Gabor or similar filter may also be used.

Returning now to the flowchart shown in FIG. 6, once the contour feature values for each contour feature point have been calculated, in step S17 the contour classifier generator 26 uses the learning image and the contour feature values supplied from the contour feature value calculator 25 as a basis for conducting a contour classifier generation process, and thus generates a contour classifier. The contour classifier generation process herein is similar to the clothing classifier generation process described with reference to FIG. 7, and thus further description thereof is omitted.

More specifically, the contour classifier generation process differs from the clothing classifier generation process only in that the feature values to be processed are contour feature values, rather than clothing feature values. Consequently, in the contour classifier generation process, a contour classifier is generated from the sum of weak classifiers corresponding to the contour feature values of contour feature points having the lowest error rates. The contour classifier generator 26 supplies the generated contour classifier and classification feature values to the ensemble classifier generator 27.

In step S18, the ensemble classifier generator 27 generates an ensemble classifier by combining the clothing classifier supplied from the clothing classifier generator 23 with the contour classifier supplied from the contour classifier generator 26.

For example, since a classifier obtained by Adaboost-based statistical learning can be expressed as a linear combination of weak classifiers, the ensemble classifier generator 27 combines the clothing classifier and the contour classifier by late fusion.

More specifically, the ensemble classifier generator 27 calculates the classifier sum $U(x)$ of the clothing classifier $R(x)$ and the contour classifier $T(x)$ by evaluating the following Eq. 13. In other words, the classifier sum $U(x)$ is derived by a taking a linear combination of the clothing classifier $R(x)$ and the contour classifier $T(x)$.

Eq. 13

$$U(x)=\alpha \cdot R(x)+\beta \cdot T(x) \tag{13}$$

In Eq. 13, $\alpha$ and $\beta$ are predetermined constants (i.e., tuning parameters), and may be calculated using factors such as the classification rate with respect to the learning images used in the statistical learning, for example. The contour classifier $T(x)$ is a sum of weak classifiers that have been multiplied by their reliability factors, and is similar to the clothing classifier $R(x)$ shown in Eq. 10.

Additionally, the ensemble classifier generator 27 uses the calculated classifier sum $U(x)$ to generate an ensemble classifier, as shown in the following Eq. 14.

Eq. 14

$$\text{Ensemble classifier}=\text{sign}(U(x)) \tag{14}$$

In Eq. 14, when the classifier sum U(x) is positive, sign(U(x)) outputs +1, which indicates that the target object to be recognized exists within the input image. When the classifier sum U(x) is negative, sign(U(x)) outputs −1, which indicates that the target object to be recognized does not exist within the input image.

Upon generating an ensemble classifier in this way, the ensemble classifier generator 27 supplies the generated ensemble classifier to the classifier recording unit 12, where the ensemble classifier is recorded. In addition, the ensemble classifier generator 27 generates a final classification feature value by adding the classification feature values supplied from the contour classifier generator 26 to the classification feature values supplied from the clothing classifier generator 23. The final classification feature value is supplied to the classifier recording unit 12 and recorded, and the learning process is terminated.

In this way, the learning apparatus 11 extracts clothing feature points from a learning image, calculates a clothing feature value for each pair of clothing feature points, and generates a clothing classifier by means of statistical learning. In addition, the learning apparatus 11 also extracts contour feature points from the learning image, calculates contour feature values, and generates a contour classifier by means of statistical learning. Subsequently, the learning apparatus 11 combines the clothing classifier and the contour classifier in a linear combination to generate an ensemble classifier.

Thus, by combining the clothing classifier and the contour classifier and generating an ensemble classifier, an ensemble classifier able to reliably detect a target object from an image can be provided. In other words, since the ensemble classifier is an ensemble of a clothing classifier, which utilizes the clothing features of the target object, as well as a contour classifier, which utilizes the contours of the target object, the target object can be detected from the image if feature values of at least one type can be sufficiently extracted.

When detecting a person as the target object from an image, it is desirable to detect that person even if his or her clothing changes. For this reason, detection of humans from an image is conducted in the related art using only contours as feature values, which do not depend on the brightness of a person's clothing.

In contrast, the learning apparatus 11 uses clothing feature values for the detection of a human from an image that utilize the features of a person's clothing, but are themselves invariant with respect to changes in the pattern of the person's clothing. These clothing feature values are newly defined feature values exploiting the observation that, statistically, a person often wears repeating patterns of the same texture on his or her upper body (i.e., a shirt), while also wearing repeating patterns of the same texture on his or her lower body (i.e., pants).

In other words, the clothing feature values indicate the degree of resemblance (i.e., the similarity) between the textures (i.e., brightness patterns) in two arbitrary regions on the image. For example, the texture similarity may be high for two regions on the person's upper body, while the texture similarity may be low between the upper body and lower body, or between the person's clothing and the background. In the learning apparatus 11, such texture similarities between pairs of regions are utilized to generate a clothing classifier for detecting a human from an image, which is then used to generate the ensemble classifier.

Consequently, even if contours are not sufficiently extracted from the input image, for example, the ensemble classifier can still be used to detect a human from the image if texture similarity features between pairs of regions can be sufficiently extracted from the image. In contrast, if the clothing worn by the person has a non-repeating pattern, or when the clothing is partially concealed in the image by a bag or other object, then texture similarity features may not be sufficiently extracted from the image. However, if contours can be sufficiently extracted from the image, then the person can be detected from the image using the ensemble classifier.

[Recognition Process]

Figure 15:
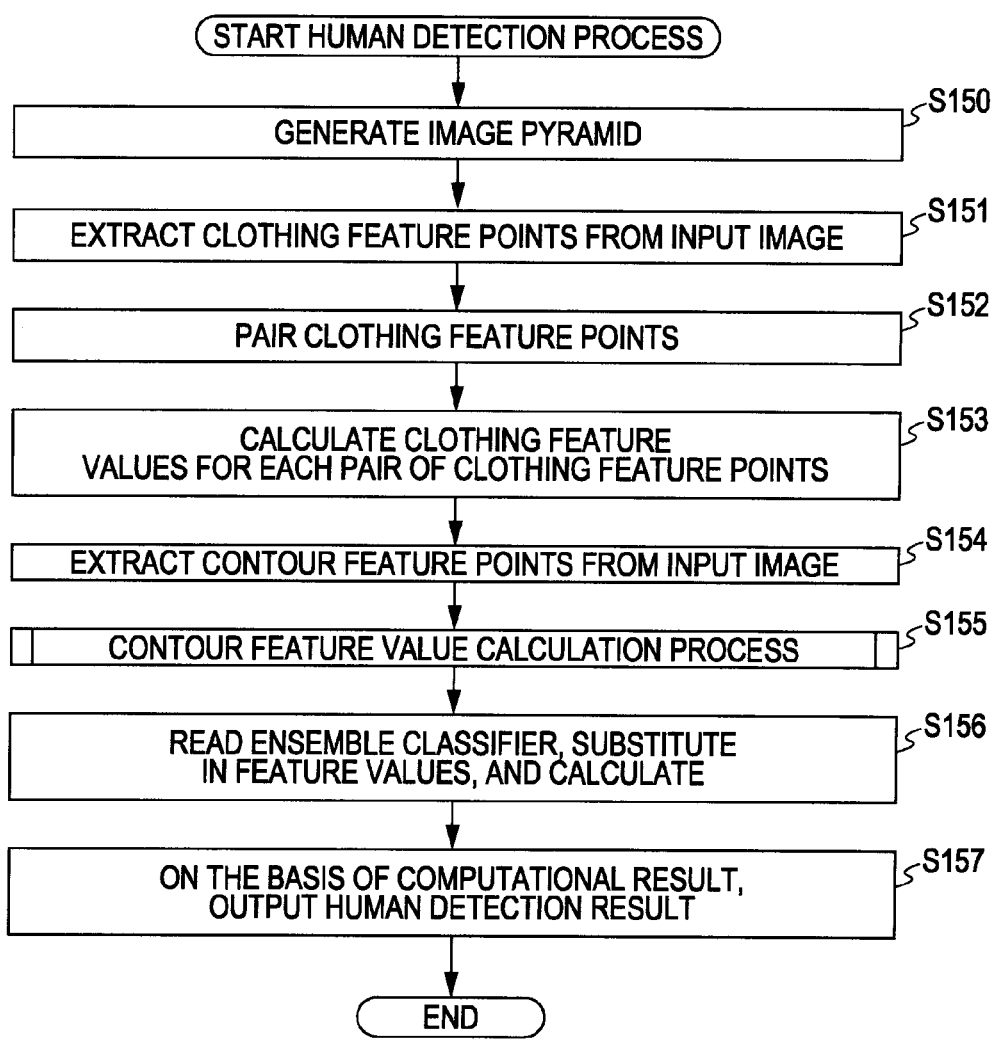
FIG. 15 is a flowchart explaining human detection processing.

A process conducted when using the learning results to detect (i.e., recognize) a target object such as a human, for example, will now be described. An input image is input into the recognition apparatus 13, and when instructions to detect a human as the target object are issued, the recognition apparatus 13 initiates a human detection process, and detects the target object from the input image. Hereinafter, the human detection process executed by the recognition apparatus 13 will be described with reference to the flowchart shown in FIG. 15.

The processing respectively conducted in steps S150 to S153 is similar to the processing respectively conducting in steps S10 to S13 in FIG. 6, and thus further description is herein omitted. In other words, the clothing feature point extractor 31 extracts clothing feature points from the input image that was input above, while the clothing feature value calculator 32 pairs the clothing feature points extracted by the clothing feature point extractor 31, and then calculates a clothing feature value for each pair. Subsequently, the clothing feature value calculator 32 supplies the clothing feature values calculated for each pair to the classification calculator 35.

The image pyramid generator 30 is configured such that, when generating an image pyramid, images are generated at the same scales (i.e., resolutions) as those of the image pyramid generated by the image pyramid generator 20 in the learning apparatus 11. By matching the scale coefficients used for recognition with the scale coefficients used for learning, it becomes possible to efficiently perform scanning during recognition.

In step S154, the contour feature point extractor 33 executes processing similar to that in step S15 of FIG. 6. Contour feature points are extracted from the input image, and then supplied to the contour feature value calculator 34 together with the input image.

In step S155, the contour feature value calculator 34 uses the input image and the contour feature points from the contour feature point extractor 33 as a basis for conducting a contour feature value calculation process, and calculates a contour feature value for each contour feature point. Subsequently, the contour feature value calculator 34 supplies the calculated contour feature values to the classification calculator 35. The contour feature value calculation process herein is similar to the contour feature value calculation process described with reference to FIG. 8, and thus further description thereof is omitted.

In step S156, the classification calculator 35 reads both the classification feature values and the ensemble classifier from the classifier recording unit 12, substitutes the feature values into the ensemble classifier, and evaluates. More specifically, the classification calculator 35 substitutes values into the ensemble classifier shown in Eq. 14 that correspond to the classification feature values from among the clothing feature values supplied by the clothing feature value calculator 32 and the contour feature values supplied by the contour feature value calculator 34, and then evaluates the ensemble classifier.

At this point, the feature values substituted into the weak classifiers constituting the ensemble classifier are feature values calculated from a pair of clothing feature points or a contour feature point on the input image, wherein the points are located at the same positions as those of a pair of clothing feature points or a contour feature point from which feature values were calculated as classification feature values. Furthermore, the feature values taken to be classification feature values are those feature values that were used to set the weak classifiers constituting the ensemble classifier during the statistical learning process.

The computational result obtained upon evaluating Eq. 14 is either +1, which indicates that the person set as the target object exists within the input image, or −1, which indicates that the person set as the target object does not exist within the input image. The classification calculator 35 supplies the computational result from the ensemble classifier to the classification result output unit 36.

In step S157, the classification result output unit 36 outputs a detection result for the person on the basis of the computational result received from the classification calculator 35, and the human detection process is then terminated. In other words, a classification result is output, indicating whether or not the target object was recognized in the input image.

Figure 16:
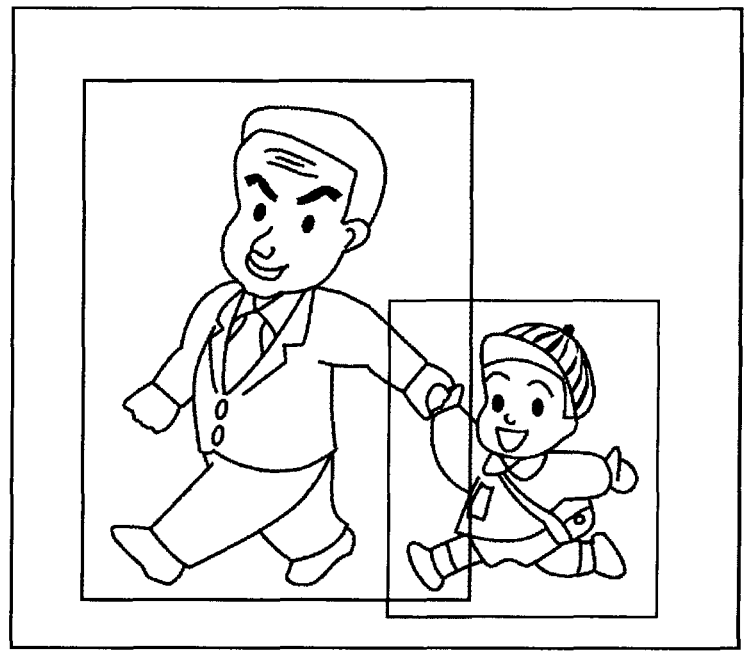
FIG. 16 illustrates an exemplary target object recognition results display.

As one example of a classification result indicating whether or not a target object has been recognized in the input image, the classification result output unit 36 may be configured to display the input image with frames enclosing the regions where the target object (i.e., a person) was detected, as shown in FIG. 16.

The input image shown in FIG. 16 contains two persons set as target objects, and frames enclosing each person are displayed on the input image. In this case, the input image is input into the classification result output unit 36, while the classification calculator 35 supplies the computational result to the classification result output unit 36, together with information indicating the regions in the input image where the target objects were detected. Then, on the basis of the computational result and the region-indicating information supplied from the classification calculator 35, the classification result output unit 36 displays the input image together with frames enclosing the regions where the target object was found in the case where the target object was detected from the input image.

In this way, the recognition apparatus 13 extracts clothing feature points from an input image and calculates clothing feature values for pairs of clothing feature points, while additionally extracting contour feature points from the input image and calculating contour feature values. Subsequently, the recognition apparatus 13 detects a target object from the input image, using both the calculated clothing feature values and contour feature values, as well as the ensemble classifier recorded in the classifier recording unit 12.

Thus, by using clothing feature values and contour feature values to detect a target object from an input image, the target object can be more reliably detected from the image. In other words, the target object can be reliably detected from the input image if at least one type of either the clothing feature values or the contour feature values can be sufficiently extracted from the input image.

Although the foregoing describes detecting a human as the target object, it should be appreciated that the target object is not limited to be being a human, and may instead be any object whose surface pattern exhibits repeating patterns of the same textures.

Also, although the foregoing describes the example of executing a statistical learning process on the basis of the discrete Adaboost algorithm, other boosting algorithms may also be applied, such as the Gentle Adaboost algorithm. The discrete Adaboost algorithm differs from the Gentle Adaboost algorithm in that while the classifier output results of the former are discrete variates, the results of the latter are continuous variates. However, the former involves multiplication by a reliability factor, and thus the output results are treated as continuous variates in practice. For this reason, the two algorithms are essentially the same.

In addition to the above, clothing classifiers and contour classifiers may also be generated by conducting statistical learning according to support vector machine (SVM), Bayesian, or other methods. However, if the statistical learning process is configured such that feature values (i.e., clothing feature values or contour feature values) are selected by Adaboost, then processing can be executed at higher speeds when detecting a person using the ensemble classifier in the recognition apparatus 13.

Although the foregoing describes generating a clothing classifier and a contour classifier, and then combining these classifiers to generate an ensemble classifier, the ensemble classifier may also be generated directly from the clothing feature values and the contour feature values, without generating the clothing classifier and the contour classifier.

As described earlier, the input image is converted into several images at different resolutions (i.e., an image pyramid), and then these images at different resolution are respectively filtered. Doing so enables calculation efficiency to be improved, thereby enabling the processing speed to be improved. Consequently, it becomes possible to recognize target objects such as humans in real-time, for example.

For example, filtering images at a plurality of scales using a plurality of filters involves significant filter computation, leading to the possibility of greatly increased processing time or processing capability. However, in the present embodiment, images at a plurality of scales are filtered using a single filter. In other words, since convolution is conducted at just one scale, images can be filtered without significant computation, thereby enabling the processing speed to be improved.

Furthermore, in the case of a multi-scale filter, convolution operations are time-consuming at low frequencies (i.e., for large values of the Gaussian width $\sigma$). However, in the present embodiment, it is possible to form the filter at a single Gaussian width $\sigma$ as described earlier. As a result, filtering is achieved without preparing a filter at a plurality of Gaussian widths, and without computing with filters at a plurality of Gaussian widths. Consequently, according to present embodiment, even it is assumed that processing is executed with a single filter prepared at the highest frequency, it is still possible to greatly improve the processing speed compared to the case of a multi-scale filter.

[Image Processing for Removal of Certain Regions]

According to an embodiment of the present invention as described above, a human or other target object appearing in an input image can be recognized. By using this ability to recognized (i.e., detect) a target object appearing in an input image, it also becomes possible to realize the following.

Figure 17:
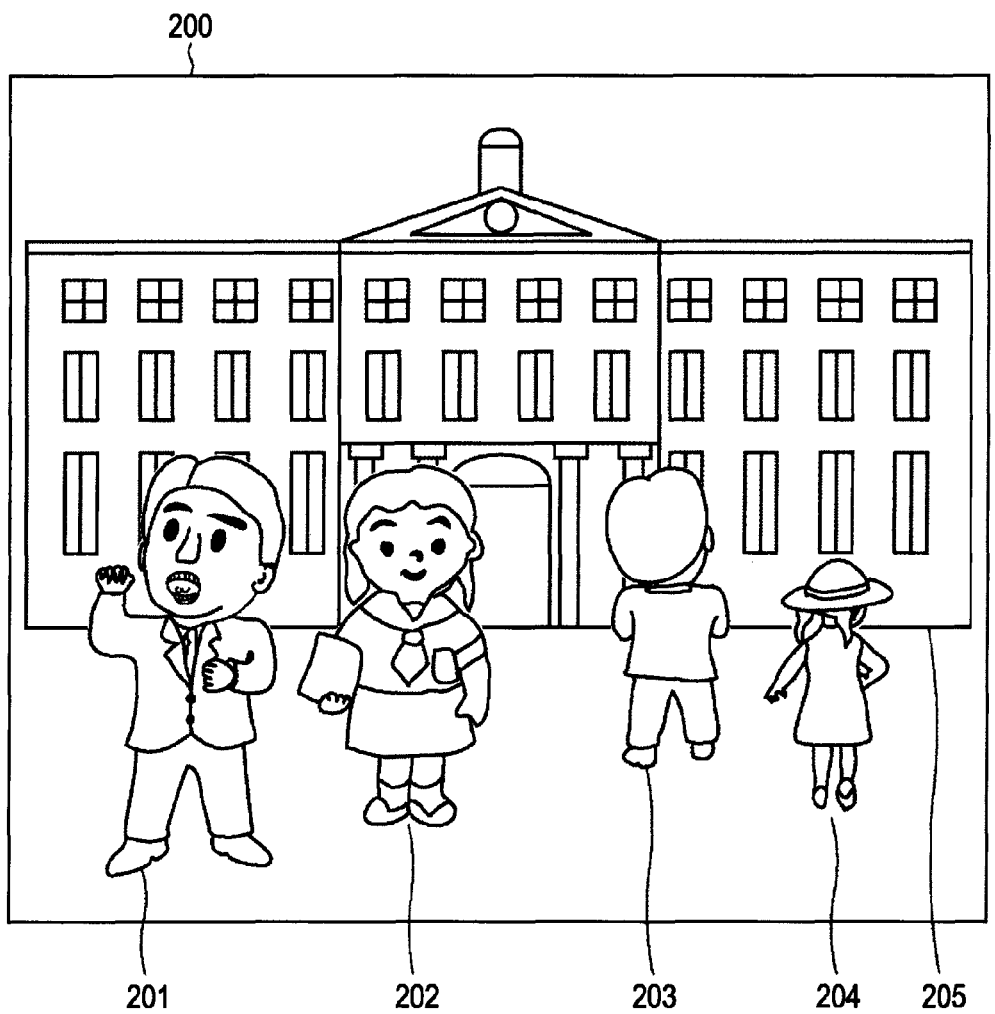
FIG. 17 illustrates an example of an acquired image.

An example will now be described wherein an image acquired by a digital still camera is to be processed, and wherein a human is set as the target object to be detected from the image. FIG. 17 illustrates an example of an image acquired by a digital still camera. The image 200 shown in FIG. 17 was acquired while a person 201, a person 202, a person 203, and person 204 were all standing in front of a building 205. Among the persons 201 to 204, the person 201 and the person 202 are facing forward, while the person 203 and the person 204 are not facing forward.

If the camera operator who acquired the image 200 shown in FIG. 17 wanted to capture the state of the person 201 and the person 202 standing in front of the building 205, then the person 203 and the person 204 were not intentionally captured by the camera operator. In this way, a camera operator sometimes acquires images unintentionally containing other persons. For example, in a timed shot, another person may enter the frame just as the shutter of the digital still camera activates. If the above occurs, an image 200 like that shown in FIG. 17 is acquired, containing a person (or persons) unintentionally captured by the camera operator.

When persons or objects unintended by the camera operator are captured in the acquired image in this way, the camera operator may naturally feel disappointed, as he or she had been hoping to acquire an image containing only the persons and buildings he or she had intended to capture. At such times, persons may be detected from an image 200 like that shown in FIG. 17, persons unintended by the camera operator may be removed, and the removed portions may be replaced with the building or other background that the camera operator had intended to capture. In so doing, the image intended by the camera operator is generated.

Figure 18A:
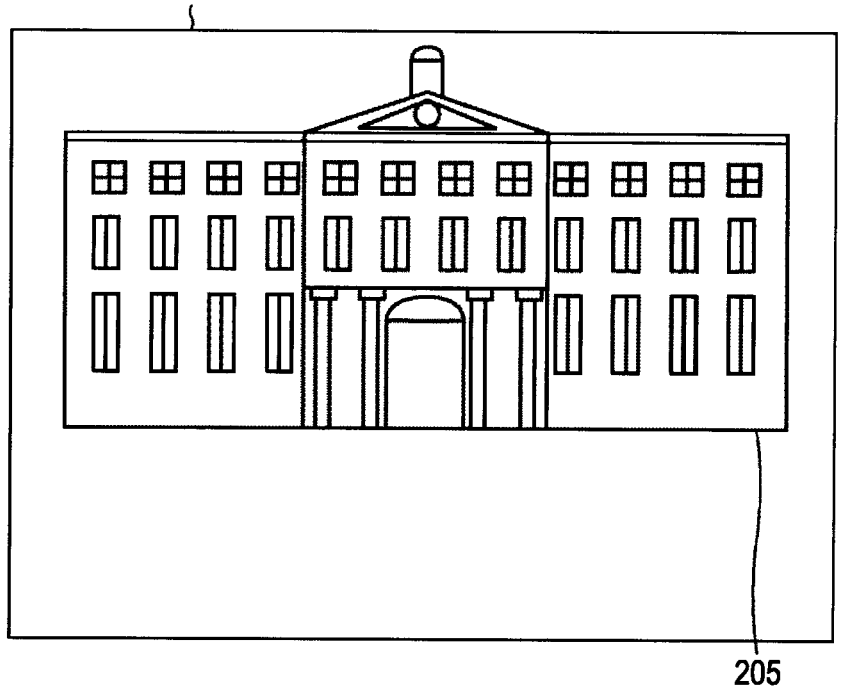
FIG. 18A illustrates an example of a background image.

In other words, an image 211 of the building 205 shown in FIG. 18A is acquired in advance as described with reference to FIG. 18A. The camera operator first acquires an image of the background he or she wants to ultimately obtain, and with the persons he or she intends to capture removed (i.e., an image containing the building or other features the camera operator intends to capture, and not containing persons the camera operator does not intend to capture). In this case, an image 211 of just the building 205 is acquired. Suppose that subsequently the image 200 is acquired, containing the persons 201 to 204 and the building 205 as shown in FIG. 17. In this case, the image 200 is analyzed, and the persons 201 to 204 are respectively detected. Such detection is conducted by applying an embodiment of the present invention as described earlier.

Figure 18B:
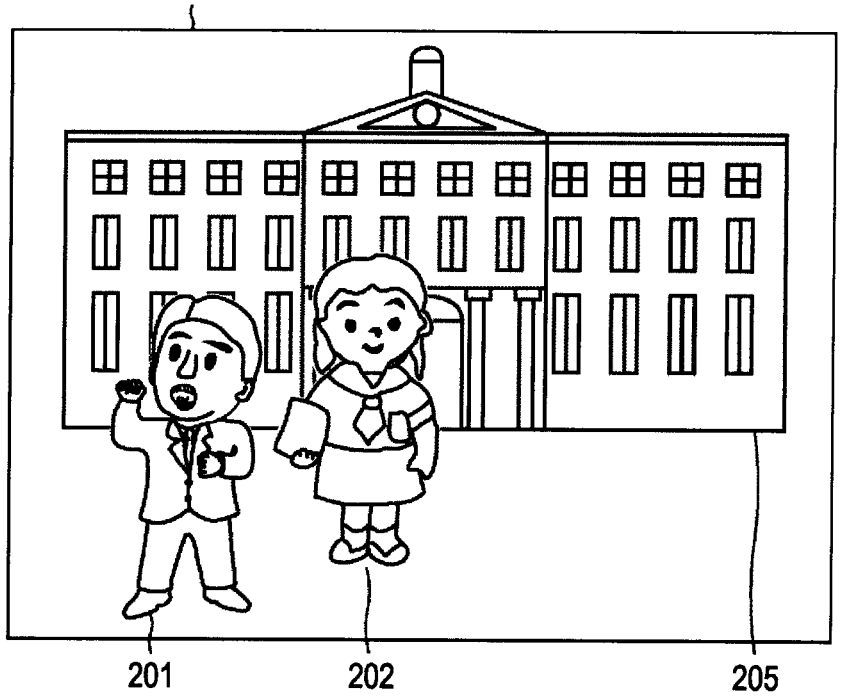
FIG. 18B illustrates an example of a desired image.

The person 201 and the person 202 are clipped out of the image 200. By then superimposing the clipped persons 201 and 202 onto the image 211 of just the building 205 (i.e., by compositing the images), the image 212 shown in FIG. 18B is generated, containing the person 201, the person 202, and the building 205 that the camera operator intended to capture.

Alternatively, after detecting the persons 201 to 204 from the image 200, the person 203 and the person 204 are removed from the image 200. Portions corresponding to the portions where the person 203 and the person 204 were removed are then clipped out from the image 211 of just the building 205. The clipped images are then superimposed onto the image 200 at the portions where the person 203 and the person 204 were removed. By conducting such processing, the image 212 shown in FIG. 18B is generated, containing the person 201, the person 202, and the building 205 that the camera operator intended to capture.

Although the image 211 is herein described as being acquired in advance, it is also possible for the camera operator to acquire the image 211 after acquiring the image 200 in order to generate the image 212. With this process flow, it is still possible to realize the image composition described above and generate the image 212.

The generation of such an image will be further described. In the following description, the background image refers to the image 211 shown in FIG. 18A, for example, and is an image containing the building or other features the camera operator intends to capture, and not containing persons the camera operator does not intend to capture. In other words, the background image captures only the features desired as the background by the camera operator.

The acquired image refers to the image 210, for example, and is an image containing the persons intended by the camera operator, and in some cases, also containing persons or other objects not intended by the camera operator. The desired image refers to the image 212 shown in FIG. 18B, for example, and is the final desired image containing the persons and the background that the camera operator intended to capture.

Figure 19:
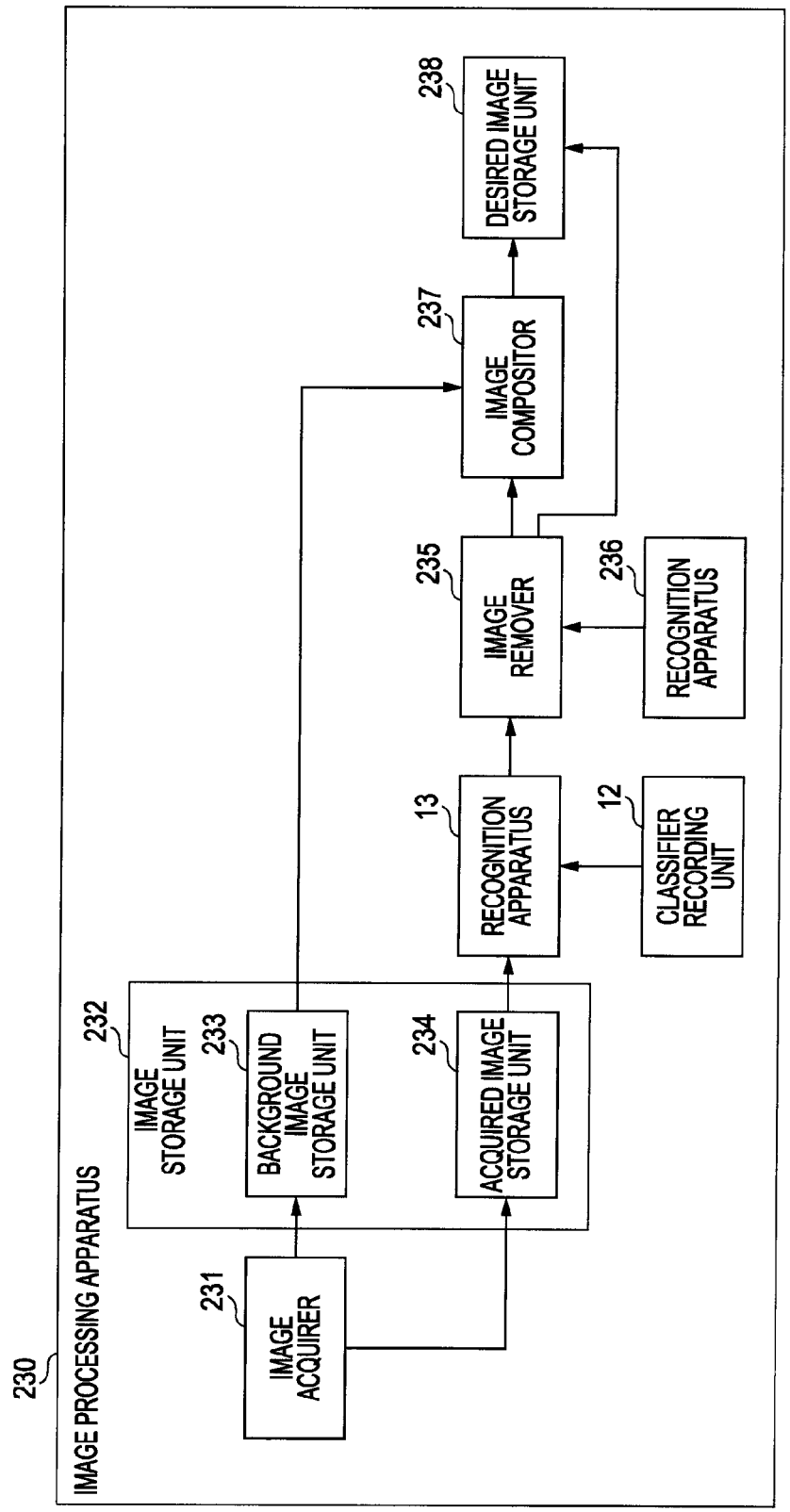
FIG. 19 illustrates an exemplary configuration of an image processing apparatus.

FIG. 19 illustrates an exemplary functional configuration of an image processing apparatus that generates an image as described above. The image processing apparatus 230 shown in FIG. 19 includes an image acquirer 231, an image storage unit 232, a background image storage unit 233, an acquired image storage unit 234, the recognition apparatus 13, the classifier recording unit 12, an image remover 235, a parameter storage unit 236, an image compositor 237, and a desired image storage unit 238.

The image processing apparatus 230 having a configuration like the above is incorporated into a device such as a digital still camera or digital video camera, for example. If the image processing apparatus 230 is incorporated into such a camera, then the process to be hereinafter described is performed with respect to acquired images (the process is executed in nearly real-time). The image processing apparatus 230 may also be incorporated into a personal computer or similar device. If the image processing apparatus 230 is incorporated into a personal computer or similar device, then the process to be hereinafter described is performed with respect to an image recorded onto a given recording medium, after the image has been acquired.

If the image processing apparatus 230 is incorporated into a digital still camera, then an image sensor or similar element is included in the image acquirer 231. By acquiring images of subjects, the image acquirer 231 obtains the background image and the acquired image. In addition, if the image processing apparatus 230 is incorporated into a device to exchange data with other devices via a network or similar means like a personal computer, then the image acquirer 231 may obtain images stored in other devices via the network. Alternatively, the image acquirer 231 may be provided with a drive that reads image data from a given recording medium, wherein the image acquirer 231 reads images by read data from a recording medium loaded into the drive.

The image storage unit 232 contains the background image storage unit 233 and the acquired image storage unit 234. The background image storage unit 233 stores the background image, while the acquired image storage unit 234 stores the acquired image. Although separately provided herein, it is possible to configure the background image storage unit 233 and the acquired image storage unit 234 as a single storage unit. For example, it is possible to separately provide the background image storage unit 233 and the acquired image storage unit 234 by dividing the memory area of a single physical storage unit into two memory areas.

The classifier recording unit 12 and the recognition apparatus 13 have functions respectively similar to the classifier recording unit 12 and the recognition apparatus 13 shown in FIG. 1, and are configured similarly. For this reason, identical reference numbers are used, and further description is herein omitted. As described earlier, according to the classifier recording unit 12 and the recognition apparatus 13, it is possible to improve both the calculation efficiency and the processing speed when detecting a target object such as a human from an input image. For this reason, acquired images can be processed in real-time even when the image processing apparatus 230 is incorporated into a digital still camera or similar device.

In the recognition apparatus 13, a person set as the target object is recognized (i.e., detected). Information regarding the person detected by the recognition apparatus 13, such as information related to the region within the acquired image where the person was detected (i.e., the coordinates of the region), is supplied to the image remover 235, together with the image data for the acquired image. The image remover 235 then removes from the acquired image the region where the person was detected, while referring to the parameters stored in the parameter storage unit 236. The parameter storage unit 236 stores parameters regarding images to be removed. The parameters stored in the parameter storage unit 236 will be described later.

Herein, the image remover 235 will continue to be described as removing particular image portions. However, the image remover 235 may also execute image clipping processing, as described later. For example, removing undesired image portions from a given image is equivalent to clipping out desired image portions from a given image. Thus, depending on how images are composited in the downstream image compositor 237, the image remover 235 either removes undesired image portions from the acquired image and outputs the remaining image after removal, or alternatively, clips out desired image portions from the acquired image and outputs the clipped images.

The image compositor 237 composites the acquired image output from the image remover 235 with the background image stored in the background image storage unit 233, and generates the desired image. The desired image thus generated is supplied to a desired image storage unit 238 provided with a predetermined recording medium, and stored thereon. In addition, if it is determined that there are no image portions to remove using the image remover 235 (i.e., if it is determined that the acquired image is the desired image), then the desired image is supplied to and stored in the desired image storage unit 238 from the image remover 235 without passing through the image compositor 237.

The operation of the image processing apparatus 230 will now be described with reference to the flowchart shown in FIG. 20.

In step S211, the image acquirer 231 acquires the background image. The background image is acquired by the camera operator. As described with reference to FIG. 18A, the camera operator acquires an image capturing only the features desired as the background. The image acquired in this way is obtained as the background image and stored in the background image storage unit 233.

Herein, although the background image will continue to be described as being acquired by the camera operator, the background image may also be obtained via a network or similar means, for example, and then stored in the background image storage unit 233. For example, a building included in a commemorative image is typically a famous building. If the building is famous, then there is a high probability that someone other than the camera operator has acquired images of the building and made them available over a network. A widely-available image such as the above may be obtained as the background image and stored in the background image storage unit 233. Additionally, a postcard or similar merchandise being sold as a souvenir at a tourist spot may also be obtained as the background image and stored.

In step S212, the acquired image is acquired and stored. The camera operator acquires an image containing the persons he or she desires to capture, and acquired from the same position as that of the background image already acquired. The acquired image is obtained by the image acquirer 231, and stored in the acquired image storage unit 234. At this point, the image that is acquired and stored may be an image that also contains persons that the camera operator did not intend to capture, like that shown in FIG. 17, or an image that contains only the persons that the camera operator did intend to capture, like that shown in FIG. 18B.

In step S214, persons are detected from the acquired image. Once the acquired image has been stored in the acquired image storage unit 234, the recognition apparatus 13 reads the acquired image stored in the acquired image storage unit 234. As described earlier, the recognition apparatus 13 is able to detect persons from an input image. Furthermore, the classifier stored in the classifier recording unit 12 is used when performing this detection. The process for detecting a person from an image (i.e., the recognition process executed in the recognition apparatus 13) has been described in the foregoing, and thus further description thereof is herein omitted.

In step S214, it is determined whether or not undesired image portions appear in the image. The image remover 235 is able to recognize a person appearing in the acquired image by referring to the recognition results from the recognition apparatus 13. The image remover 235 then refers to the parameters stored in the parameter storage unit 236 to determine whether that person is someone intended to be captured by the camera operator, or someone else. At this point, the parameters stored in the parameter storage unit 236 will be described with reference to FIGS. 21A to 21C.

Figure 21A:
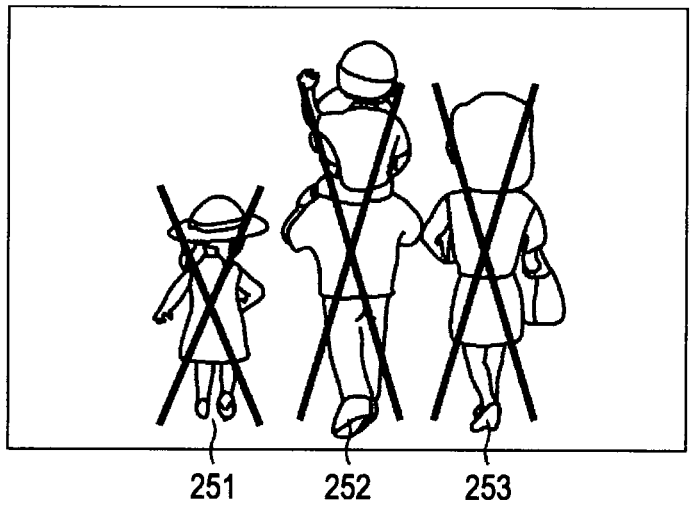
FIG. 21A explains parameters.

The persons 251 to 253 in the image shown in FIG. 21A are facing backward. In a commemorative image, for example, people are normally captured while facing forward. In consideration of the above, it is conceivable that the persons 251 to 253 in the image shown in FIG. 21A were not intentionally captured by the camera operator. Thus, a parameter 1 is provided, stipulating that images of backward-facing persons are to be removed.

Figure 22:
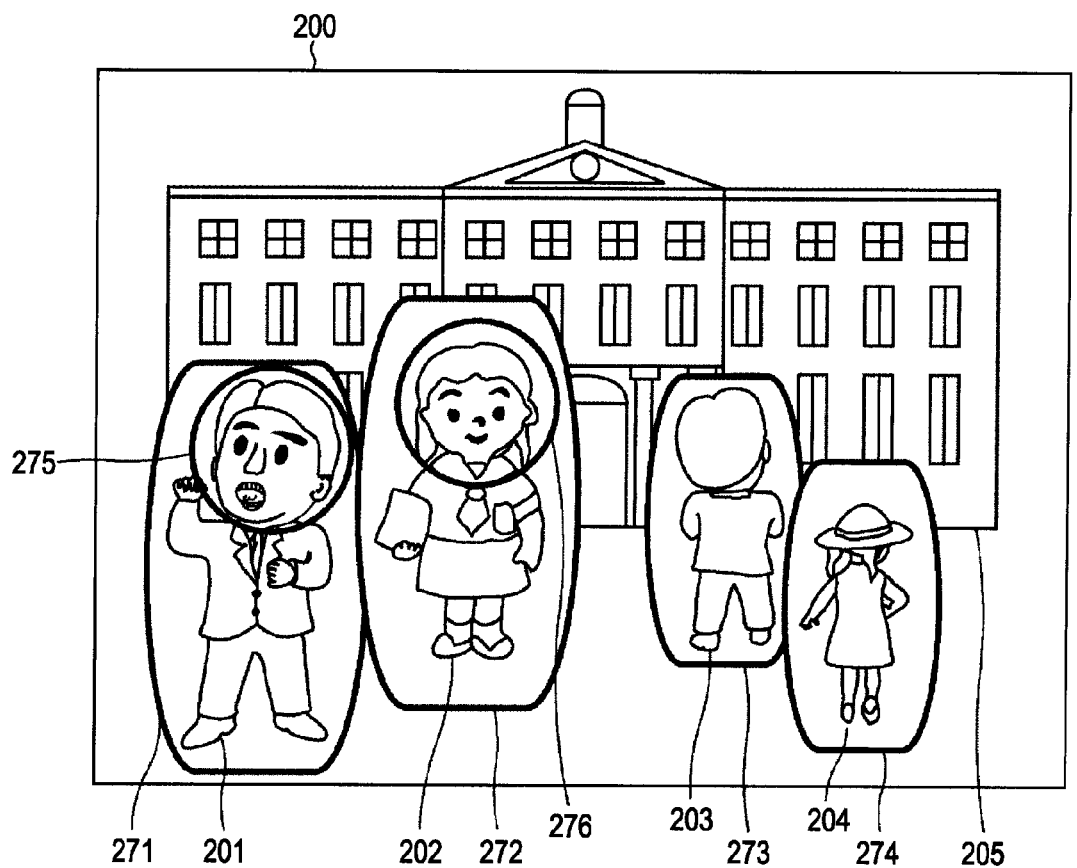
FIG. 22 explains face detection.

In order to determine whether or not the parameter 1 applies, not only are the regions of persons detected from the acquired image, but in addition, the faces of the detected persons are additionally detected. Such face detection will now be described with reference to FIG. 22. FIG. 22 is a diagram for explaining the recognition results obtained when the image 200 shown in FIG. 17 is processed by the recognition apparatus 13. As shown in FIG. 22, the persons 201 to 204 are detected from the image 200. In FIG. 22, those detected regions are indicated as the regions 271 to 274. In other words, region 271 is the region where the person 201 was detected from the image 200, while the region 272 is the region where the person 202 was detected. Similarly, the region 273 is the region where the person 203 was detected from the image 200, while the region 274 is the region where the person 204 was detected.

Since the person 201 is also facing forward, his face is also detected. The region 275 is the region of this detected face. Similarly, since the person 202 is also facing forward, her face is also detected, and the region 276 is the region of the detected face. However, the person 203 and the person 204 are facing backward, and thus their faces are not detected. In this way, if both a person and his or her face are detected, it can be determined that the person is facing forward. In contrast, if a person is detected, but his or her face is not detected, it can be determined that the person is facing backward.

In this way, by detecting a person and then detecting his or her face from the acquired image, it can be determined whether or not that person is facing forward. When configured for such a case, the recognition apparatus 13 is provided with face recognition functions for detecting faces. If the recognition apparatus 13 includes face recognition functions, then the classifier recording unit 12 also stores classifiers for face detection. It is possible to generate such classifiers for face detection by conducting learning using a plurality of images, similar to that of the classifiers for human detection described earlier. Classifiers generated in this way are stored in the classifier recording unit 12. Alternatively, classifiers may be generated by conducting learning according to a different learning method, and then stored in the classifier recording unit 12.

Alternatively, the functions for detecting faces may be provided elsewhere than the recognition apparatus 13, and components may be added to the image processing apparatus 230 shown in FIG. 19. Even if components are added, it is still possible to generate the classifiers by conducting learning using a plurality of images, similar to that of the classifiers for human detection described earlier. It is also possible to add functions for classifying (i.e., detecting) faces without using classifiers.

Figure 21B:
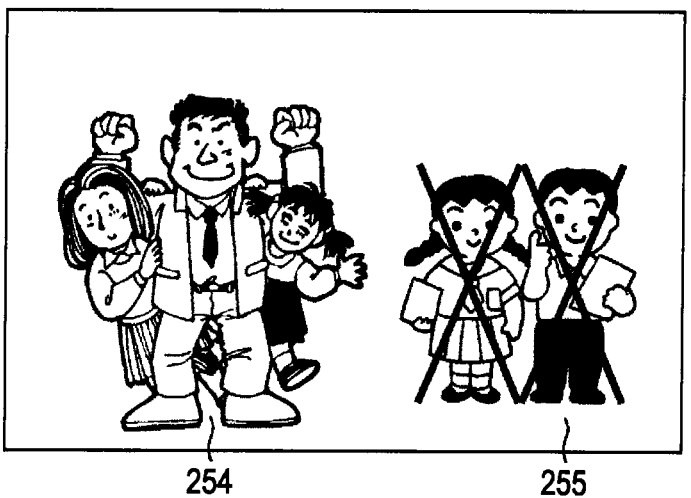
FIG. 21B explains parameters.

The description will now return to the parameters stored in the parameter storage unit 236. The people 253 in the image shown in FIG. 21B are the camera operator's family (i.e., the family including the camera operator), while the people 255 are not the camera operator's family (i.e., strangers). In such an image, the family members 254 are conceivably the one or more persons that the camera operator intends to capture, while the non-family members 255 are conceivably not the one or more persons that the camera operator intends to capture. Thus, a parameter 2 is provided, stipulating that images of non-family members are to be removed.

In order to determine whether a person is a family member or a non-family member, there is provided a mechanism for registering family member information in advance. Family member faces (i.e., image data) are stored in the parameter storage unit 236. This registration is conducted according to instructions from the user (i.e., the camera operator). For example, when a family member is captured in an image, face detection may be conducted with respect to that image. The face detection results are then displayed in the display of the digital still camera. The displayed screen may be a screen like that shown in FIG. 22, for example, wherein the regions where faces were detected are indicated using a predetermined graphic, such as a circle. The camera operator (i.e., the user) then selects one or more faces to be registered from such a screen. The selected faces (i.e., image data) are stored in the parameter storage unit 236.

By matching faces in the acquired image with faces stored in this way in the parameter storage unit 236, it is determined whether or not those faces have been registered. Herein, face classification will continue to be described as being executed by a matching process, but face classification may also be executed by a process other than matching.

The image remover 235 detects faces from the acquired image. In order to do so, the image remover 235 includes face detection functions like those described with respect to the parameter 1. Upon detecting a face, the image remover 235 uses the image data stored in the parameter storage unit 236 to determine whether or not a face matching the detected face is stored in the parameter storage unit 236. If the image remover 235 determines that the face matches a registered face, then that face is set as a non-removal image. If the image remover 235 determines that the face does not match a registered face, then that face is set as an image to be removed.

By conducting such processing, family members and non-family members are distinguished, and images of non-family members are set as images to be removed. As described earlier, faces (i.e., persons) other than those stored (i.e., registered) in the parameter storage unit 236 are treated as images to be removed. Thus, the parameter 2 can also be described as a parameter stipulating that the images of all persons other than the registered persons are to be treated as images for removal.

Although face registration is herein described as being conducted on the basis of selections and instructions from the camera operator, the image remover 235 may also be configured to conduct registration by means of processing that does not involve selections and instructions from the camera operator. For example, a plurality of acquired images may be accumulated, and faces commonly detected in the accumulated images may be registered. For example, if the image remover 235 detects a face, then that face may be temporarily stored in the parameter storage unit 236. Subsequently, if the image remover 235 detects another face, and if the detected face matches the face temporarily stored in the parameter storage unit 236, then a match count for that face is incremented by 1. When the match count of a face image stored in parameter storage unit 236 becomes a predetermined count, then the image remover 235 formally registers that face in the parameter storage unit 236.

In so doing, it becomes possible for faces captured many times, such as the faces in images of children, for example, to be registered without inconveniencing the camera operator (i.e., the user).

As with the parameter 1, if the recognition apparatus 13 includes functions for detecting family members, then classifiers for detecting family members may be stored in the classifier recording unit 12. It is possible to generate such classifiers by conducting learning using a plurality of images capturing family members and a plurality of images that do not capture family members, similar to that of the classifiers for human detection described earlier. Classifiers generated in this way are stored in the classifier recording unit 12. Alternatively, classifiers may be generated by conducting learning according to a different learning method, and then stored in the classifier recording unit 12.

Figure 21C:
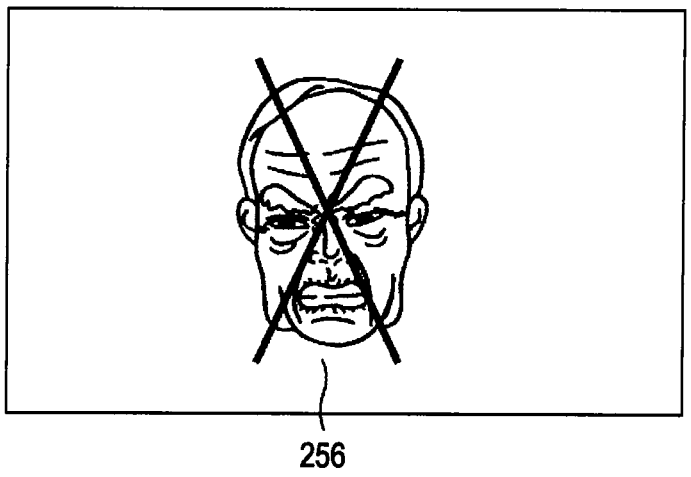
FIG. 21C explains parameters.

The description will now return to the parameters stored in the parameter storage unit 236. The person 256 in the image shown in FIG. 21C is not smiling. Normally, people are smiling when they appear in a commemorative image. Thus, a parameter 3 is provided, stipulating that image of non-smiling persons are to be removed. In order to determine whether or not someone is smiling, his or her face is detected, and in addition, a determination is made regarding whether or not the face is smiling. In order to make such determinations, the image remover 235 includes smile recognition functions.

When the recognition apparatus 13 includes smile recognition functions, then classifiers for smile detection are also stored in the classifier recording unit 12. It is possible to generate such classifiers by conducting learning using a plurality of images containing smiles and a plurality of that do not contain smiles, similar to that of the classifiers for human detection described earlier. Classifiers generated in this way are stored in the classifier recording unit 12. Alternatively, classifiers may be generated by conducting learning according to a different learning method, and then stored in the classifier recording unit 12.

Such parameters are stored in the parameter storage unit 236. Among the above parameters 1 to 3, just one parameter may be stored in the parameter storage unit 236 and processed, or two or three parameters from among the parameters 1 to 3 may be stored, combined, and processed. Moreover, the parameters are not limited to the above parameters 1 to 3, and parameters other than those described above may be stored in the parameter storage unit 236 and processed.

Parameters other than those described above may also be combined with the above parameters 1 to 3 and processed.

If all of the above parameters 1 to 3 are stored in the parameter storage unit 236 and processed, then the image remover 235 first detects images to be removed using the parameter 1, and sets the images (i.e., portions of the acquired image) to be removed. Subsequently, the remaining image portion not set for removal (i.e., the images of persons facing forward) are subjected to processing, wherein images to be removed are detected using the parameter 2, and the images to be removed are set. At this point, the faces detected during the detection by the parameter 1 are used in the detection by the parameter 2. The remaining image portion not detected by either parameter 1 or 2 (i.e., the remaining images not set for removal) are subjected to processing. In other words, images of persons who are both facing forward and registered are subjected to further processing, wherein images to be removed are detected using the parameter 3, and the images to be removed are set. By means of the parameter 3, images of persons who are both facing forward and registered, but not smiling, are detected as images to be removed.

In this way, when a plurality of parameters are stored in the parameter storage unit 236, it can be successively determined whether each parameter is applicable. Alternatively, the processing for each parameter may be conducted in parallel, and then the final images to be removed may be set.

Figure 20:
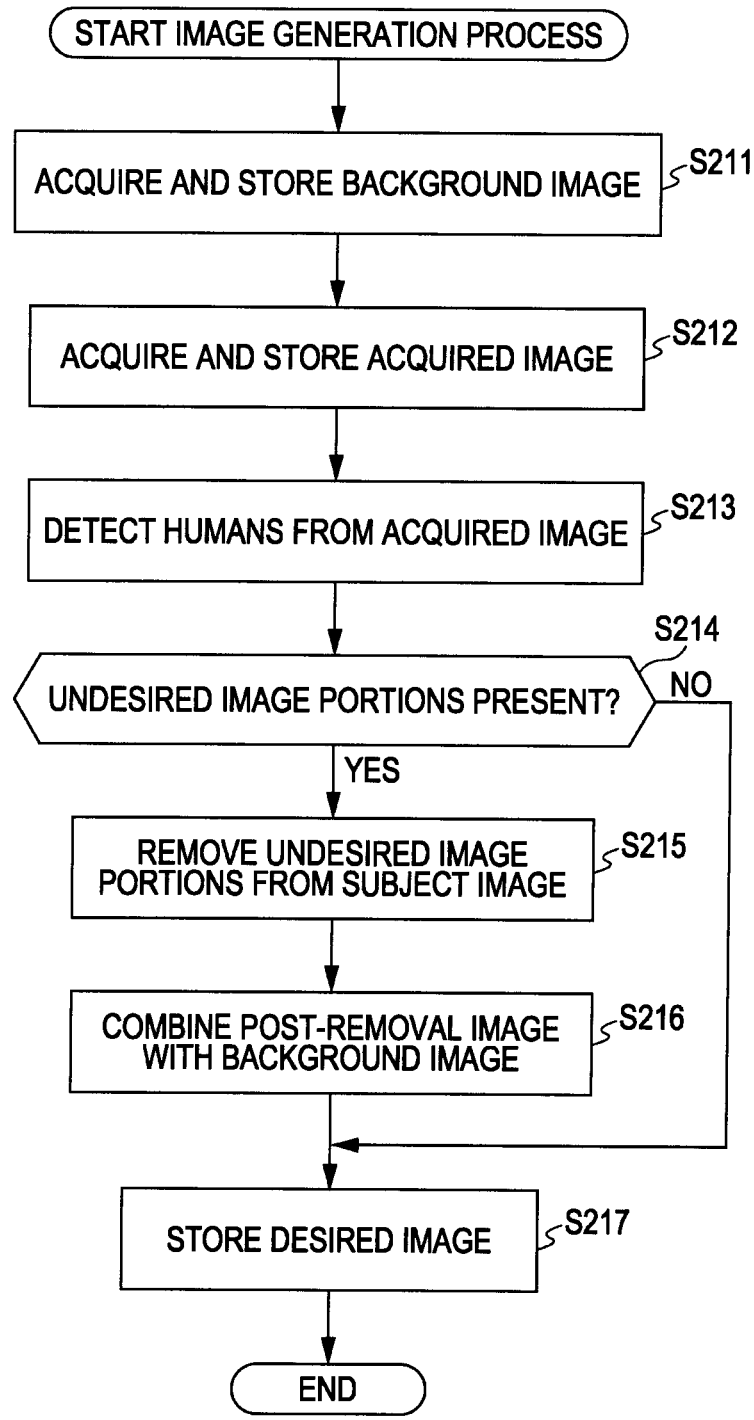
FIG. 20 is a flowchart for explaining the operation of an image processing apparatus.

The description will now return to the flowchart shown in FIG. 20. If the image remover 235 determines in step S214 that undesired image portions appear in the acquired image, then the process proceeds to step S215. In step S215, undesired image portions are removed from the acquired image. In other words, the image remover 235 removes, from the acquired image, images (i.e., portions of the acquired image) to which the parameters stored in the parameter storage unit 236 (herein taken to be the above parameters 1 to 3) are applicable.

The acquired image from which the image portions subject to the parameters 1 to 3 have been removed (herein referred to as the corrected image) is supplied to the image compositor 237 from the image remover 235. In step S216, the image compositor 237 composites the corrected image from the image remover 235 with the background image stored in the background image storage unit 233, thereby generating the desired image.

Herein, the image remover 235 supplies the image compositor 237 with a corrected image generated by removing undesired image portions from the acquired image. In other words, the corrected image is an image generated by removing the image portions of backward-facing persons from the acquired image, for example. When such a corrected image is supplied to the image compositor 237, the image compositor 237 generates the desired image by clipping out image portions from the background image that correspond to the removed portions in the corrected image, and then compositing the clipped images with the corrected image.

However, the image remover 235 may also supply the image compositor 237 with a corrected image generated by removing undesired image portions from the acquired image and clipping out the desired image portions. In other words, the corrected image is an image generated by clipping out image portions other than those of backward-facing persons, for example, from the acquired image. When such a corrected image is supplied to the image compositor 237, the image compositor 237 generates the desired image by compositing (i.e., superimposing) the clipped image portions with the background image.

Alternatively, the image remover 235 may set image portions for removal, and then output the settings information and the acquired image to the image compositor 237. The image compositor 237 may then generate the desired image on the basis of the settings information by compositing the acquired image with the background image.

The desired image thus generated is supplied to and stored in the desired image storage unit 238 in step S217. Meanwhile, if it is determined in step S214 that undesired image portions do not appear in the acquired image (i.e., if it is determined that the acquired image is the desired image), then the process proceeds to step S217, and the acquired image is supplied to and stored in the desired image storage unit 238 as the desired image.

In this way, persons are detected, and it is determined whether or not the detected persons are to remain as part of an acquired image, wherein only those persons determined to remain are composited with a background image. In so doing, it becomes possible to enable the camera operator to obtain his or her desired image. Alternatively, persons may be detected, and it may be determined whether or not the image portions of the detected persons are to be removed from the acquired image. The persons determined to be removed are then removed, and the removed regions are composited with the background image. In so doing, it becomes possible to enable the camera operator to obtain his or her desired image.

In other words, in the embodiment of the present invention described above, predetermined target objects are detected from an acquired image, and the regions where those target objects were detected are set as regions to be processed in a later process. Subsequently, a new image is generated by processing the set regions in a predetermined way. Alternatively, everywhere other than the regions set for processing may be taken to be a new region set for processing, and a new image may be generated by processing the new region in a predetermined way. By executing such processing, it becomes possible to enable the camera operator to obtain his or her desired image.

Although the foregoing embodiment describes by way of example the case of humans as the target object, the above processing may also, for example, be executed with vehicles or other objects as the target object. For example, when a vehicle appears in an acquired image, that vehicle may be removed by superimposing portions of the background image, and thereby generating the desired image.

The foregoing embodiment also describes, by way of example, the desired image being generated by removing image portions subject to parameters from the acquired image, and then compositing with the background image. However, other methods than the above may be used. For example, an image may be acquired by the image acquirer 231 when it is determined by the image remover 235 that there are no image portions subject to the parameters stored in the parameter storage unit 236. In other words, in a digital still camera, images being acquired by the image acquirer 231 are processed by the image remover 235 in real-time. It is thus possible to conduct a control such that when it is determined that there are no image portions subject to the parameters, instructions are issued from the image remover 235 to the image acquirer 231 so as to activate the shutter.

By controlling camera operation in this way, the shutter is activated only when a desired image can be acquired, thereby enabling acquisition and storage of just desired images. In addition, it is also possible to conduct other controls by means of set parameters, such that the shutter is activated when it is determined that a person is facing forward or when it is determined that no persons are facing backward. Alternatively, the image may be overwritten with a pre-registered background image when a backward-facing person is present.

In addition, in the foregoing embodiment, the regions where persons are detected may be configured such that full-body regions are detected, or such that only upper-body regions or lower-body regions are detected.

[A Pixelizing Image Processing Apparatus]

Figure 23:
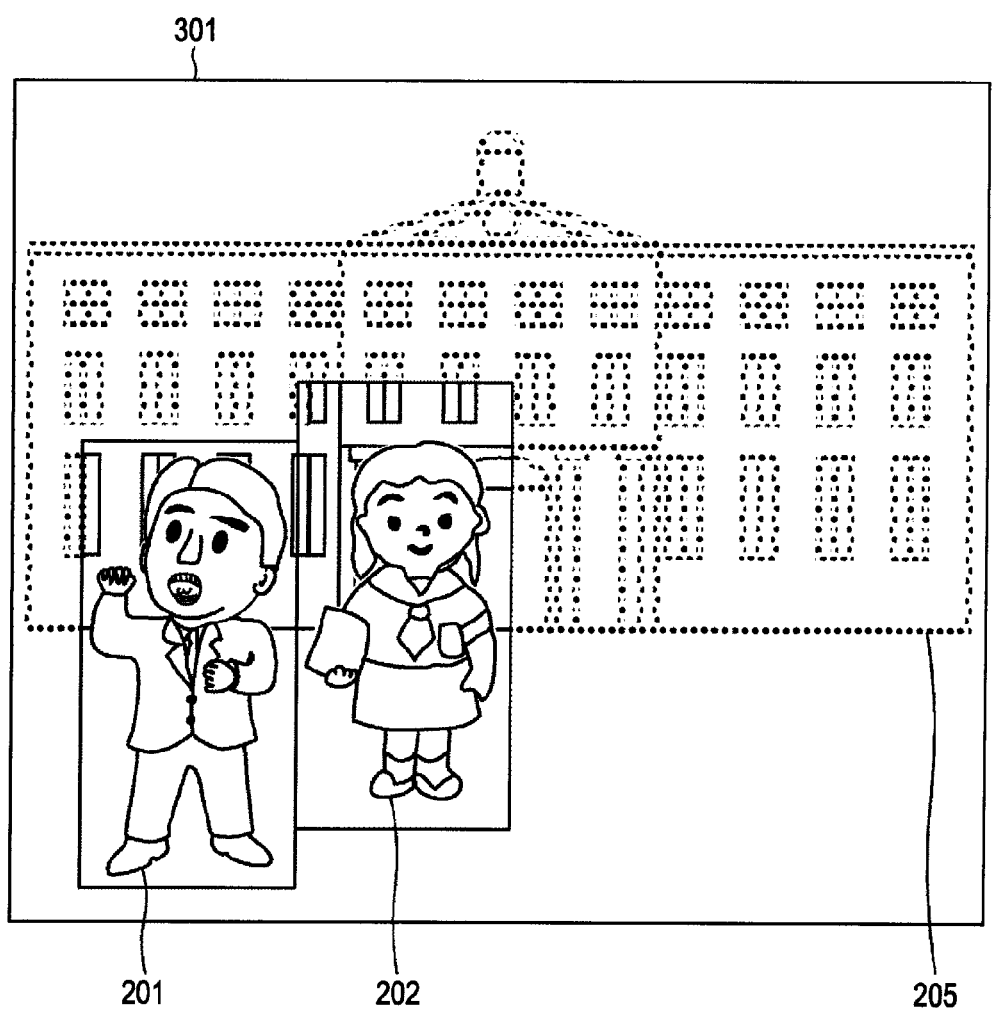
FIG. 23 explains mosaic processing.
Figure 24:
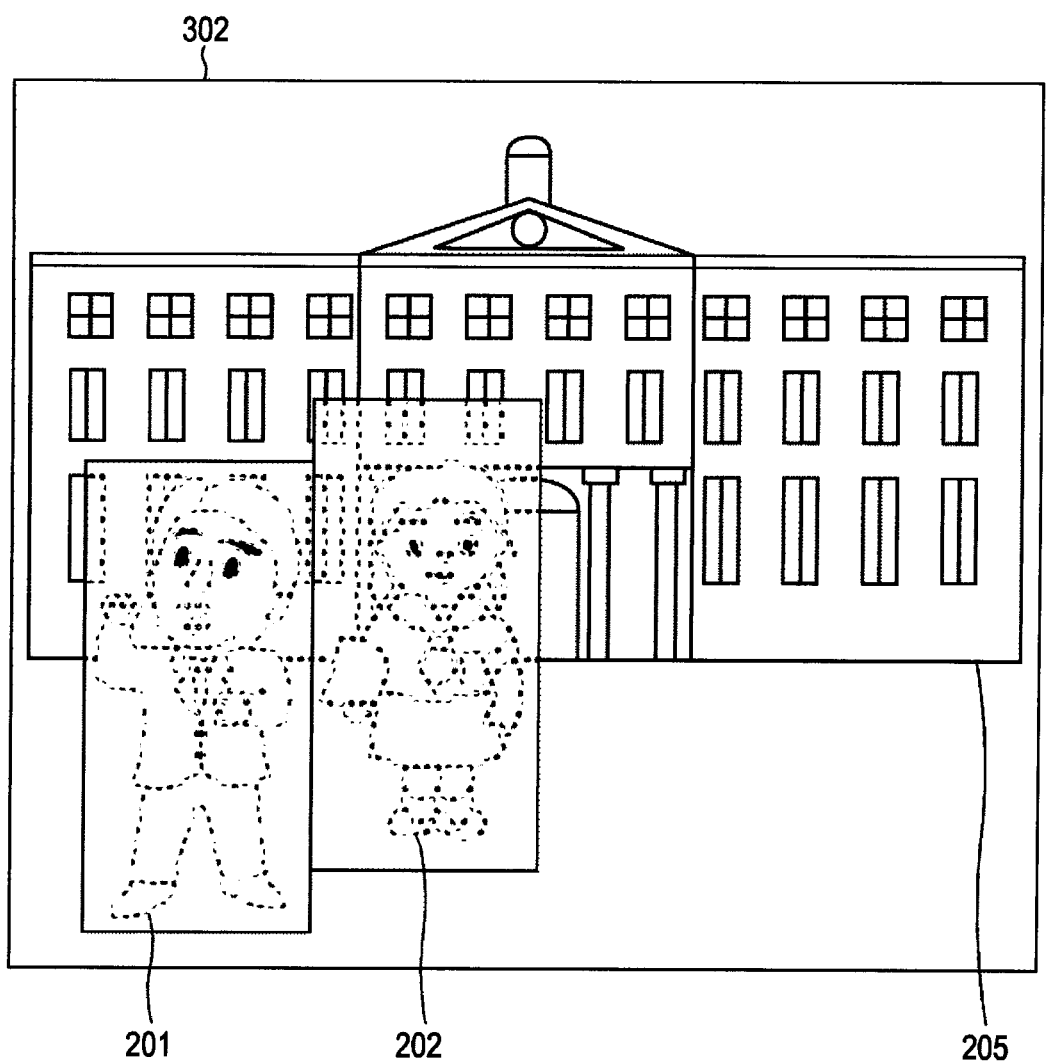
FIG. 24 explains mosaic processing.

The case will now be described for utilizing the detection of humans described above to execute processing to pixelize (i.e., apply a mosaic to) all image portions other than those of the detected persons, or alternatively, to the image portions of the detected persons. FIGS. 23 and 24 respectively illustrate examples of pixelized images. The image 301 shown in FIG. 23 and the image 302 shown in FIG. 24 are both images generated by pixelizing the image 212 shown in FIG. 18B, wherein the image 212 itself has been acquired directly, or alternatively, wherein the image 212 shown in FIG. 18B has been obtained as a result of first processing the image shown in FIG. 17.

The image 301 shown in FIG. 23 is an image generated by pixelizing all image portions other than those of the person 201 and the person 202. The image 301 is generated by detecting the person 201 and the person 202 from the acquired image, and then pixelizing all portions other than those of the person 201 and the person 202.

The image 302 shown in FIG. 24 is an image generated by pixelizing the image portions of the person 201 and the person 202. The image 302 is generated by detecting the person 201 and the person 202 from the acquired image, and then pixelizing the portions of the person 201 and the person 202.

In recent years, the publishing of journals on the Internet called blogs has proliferated, and there is an increasing tendency for photographs to appear on such blogs. However, when publishing photographs on the Internet, there is a possibility of an indeterminate number of people viewing the photographs. Thus, a blogger may want to present his or her own face, but not want to present a photograph of scenery containing a building or other object at his or her travel destination. Alternatively, the blogger may not want to present his or her own face, but instead want to present a photograph of scenery containing a building or other object at his or her travel destination.

The image 301 shown in FIG. 23 is an image for the former. In other words, the image 301 is an image generated when the user wants to present people, but does not want to present buildings or other background image portions, and is generated by pixelizing those background image portions the user does not want to present. The image 302 shown in FIG. 24 is an image for the latter. In other words, the image 302 is an image generated when the user does not want to present people, but does want to present buildings or other background image portions, and is generated by pixelizing those persons the user does not want to present. Although the example described herein is for the case of humans as the target object, the pixelization process may also be applied with vehicles or other objects as the target object, for example.

Figure 25:
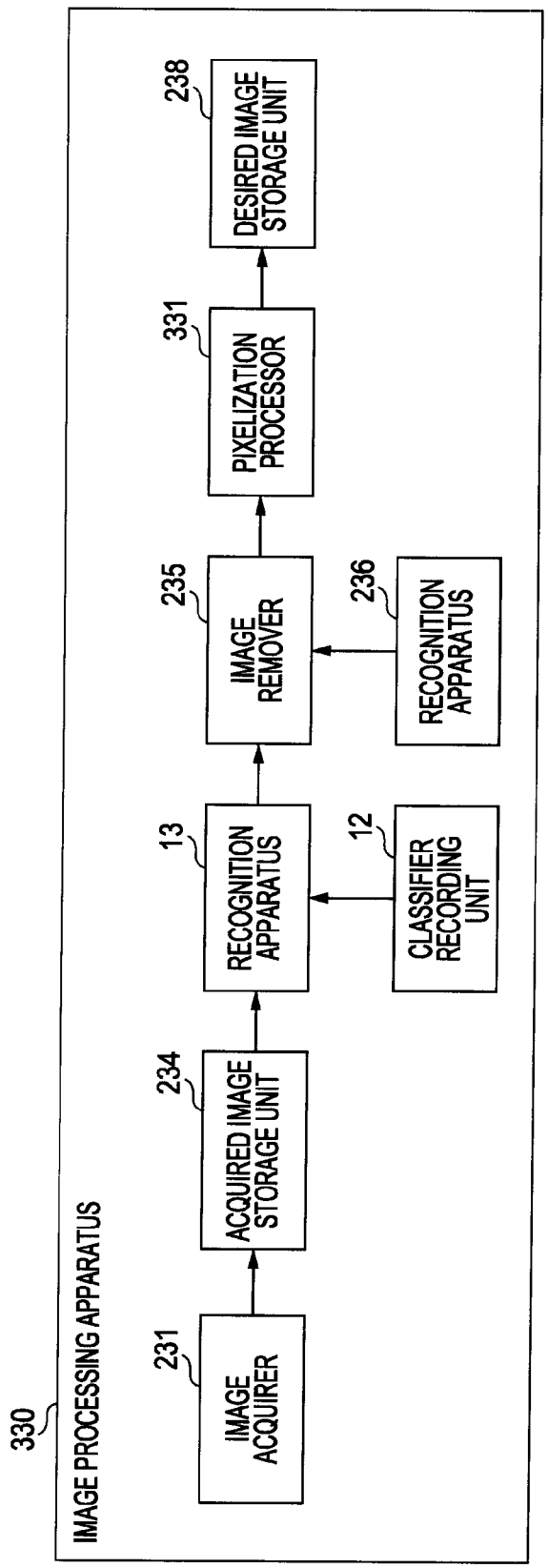
FIG. 25 illustrates another configuration of an image processing apparatus.

FIG. 25 illustrates an exemplary configuration of an image processing apparatus that executes such a pixelization process. The image processing apparatus 330 shown in FIG. 25 includes the image acquirer 231, the acquired image storage unit 234, the recognition apparatus 13, the classifier recording unit 12, the image remover 235, the parameter storage unit 236, a pixelization processor 331, and the desired image storage unit 238. The image processing apparatus 330 having a configuration like the above is incorporated into a device such as a digital still camera or digital video camera, for example.

In the image processing apparatus 330 shown in FIG. 25, functions similar to those of the image processing apparatus 230 shown in FIG. 19 are given identical reference numbers, and further description thereof is omitted where appropriate. The image processing apparatus 330 shown in FIG. 25 obtains an acquired image using the image acquirer 231, temporarily stores the acquired image in the acquired image storage unit 234, and then executes recognition processing with respect to the stored acquired image using the recognition apparatus 13.

Similarly to that described earlier, the recognition apparatus 13 uses classifiers stored in the classifier recording unit 12 to recognize (i.e., detect) target objects such as humans, and then supplies the detection results and the acquired image to the image remover 235. Similarly to that described earlier, the image remover 235 determines whether or not there exist portions of the acquired image subject to parameters stored in the parameter storage unit 236, and if so, sets those image portions for removal. The pixelization processor 331 pixelizes the image portions set for removal by the image remover 235, and generates the desired image. The desired image generated in this way is supplied to and stored in the desired image storage unit 238.

Figure 26:
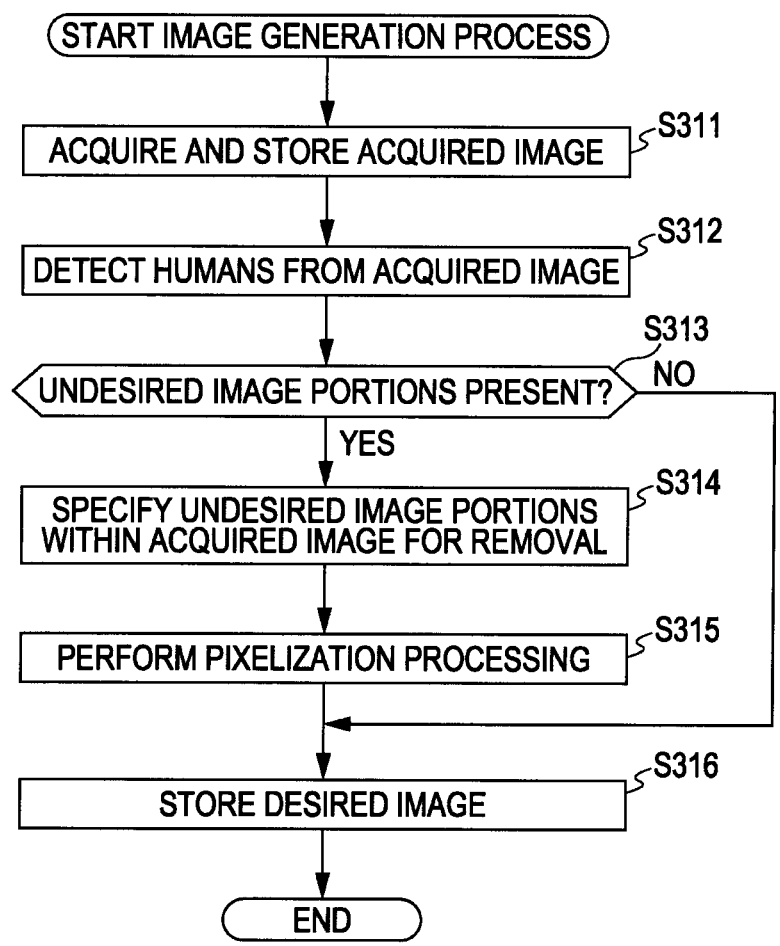
FIG. 26 is a flowchart for explaining the operation of an image processing apparatus.

The operation of the image processing apparatus 330 will now be described in further detail and with reference to the flowchart shown in FIG. 26. In step S311, the acquired image is obtained by the image acquirer 231 and stored in the acquired image storage unit 234. In step S312, the recognition apparatus 13 detects target objects such as humans from the acquired image stored in the acquired image storage unit 234. Herein, the target object will continue to be described as being humans. The processing in steps S311 and S312 is basically similar to that in step S212 and S213 in the flowchart shown in FIG. 20, and thus detailed description thereof is omitted.

In step S313, the image remover 235 determines whether or not undesired image portions appear in the acquired image. Undesired image portions herein refer to image portions to which the parameters stored in the parameter storage unit 236 are applicable. In the present embodiment, the parameters stored in the parameter storage unit 236 are as follows. If the desired image is taken to be the image 301 as shown in FIG. 23, then a parameter stipulates that image portions other than those of humans are to be removed. If the desired image is taken to be the image 302 as shown in FIG. 24, then a parameter stipulates that image portions of humans are to be removed. In addition to the above parameters, it is also possible to set parameters such that the image portions of humans that are to be removed additionally satisfy or fail to satisfy the parameters 1 to 3 described earlier.

If it is determined in step S313 that undesired image portions appear in the acquired image, then the process proceeds to step S314. In step S314, the image remover 235 sets the images subject to the parameters (i.e., the regions containing such images) as images to be removed. This settings information and the acquired image are supplied to the pixelization processor 331. In step S315, the pixelization processor 331 refers to the supplied settings information and pixelizes the images set for removal (i.e., the regions containing such images). By pixelizing the acquired image in the image portions set for removal, the pixelization processor 331 generates the desired image.

In step S316, the desired image thus generated is supplied to the desired image storage unit 238. Meanwhile, if it is determined in step S313 that undesired image portions do not appear in the acquired image (i.e., if it is determined that the acquired image is the desired image), then the process proceeds to S316, and the acquired image is stored in the desired image storage unit 238 as the desired image.

In this way, it becomes possible to enable the camera operator to obtain his or her desired image by detecting target objects and then pixelizing either those target objects, or the portions other than the target objects. Consequently, it is possible to pixelize persons wishing to protect their privacy, or to pixelize background image portions to protect privacy related to the surrounding environment. Moreover, such pixelization processing can be conducted without inconveniencing the camera operator (i.e., the user).

Thus, in an embodiment of the present invention, it is possible to apply various processes to an acquired image by detecting a target object such as humans. Additionally, such human detection can be conducted precisely and with decreased computational complexity. For this reason, it is possible to incorporate an embodiment of the present invention into a compact device such as a digital still camera.

The foregoing series of processes may be executed by means of hardware or software. In the case of executing the series of processes by means of software, a program constituting such software may be installed on a computer built into special-purpose hardware. Alternatively, the program may be installed from a program recording medium onto a general-purpose computer (such as a personal computer, for example) capable of executing various functions by installing various programs thereon.

FIG. 27 is a block diagram illustrating an exemplary hardware configuration of a computer that executes the foregoing series of processes by means of a program.

In the computer, a CPU (Central Processing Unit) 501, ROM (Read-Only Memory) 502, and RAM (Random Access Memory) 503 are mutually connected by a bus 504.

The bus 504 is additionally connected to an input/output interface 505. The input/output interface 505 is connected to: an input unit 506 made up of components such as a keyboard, mouse, a microphone; an output unit 507 made up components such as a display and one or more speakers; a recording unit 508 made up of components such as a hard disk and non-volatile memory; a communication unit 509 made up of components such as a network interface; and a drive 510 that drives a removable medium 511, such as an optical disc, a magneto-optical disc, or semiconductor memory.

In the computer configured as described above, the CPU 501 may, for example, execute a program recorded in the recording unit 508 by loading the program into the RAM 503 via the input/output interface 505 and the bus 504. In so doing, the foregoing series of processes is conducted.

The program executed by the computer (i.e., the CPU 501) may be recorded onto the removable medium 511, being packaged media realized by magnetic disks (including flexible disks), optical discs (including CD-ROMs (Compact Discs Read-Only Memory) and DVDs (Digital Versatile Discs)), magneto-optical discs, or semiconductor memory. Alternatively, the program may be provided via a wired or wireless transmission medium such as a local area network, the Internet, or a digital satellite broadcast.

The program can be installed in the recording unit 508 via the input/output interface 505 by loading the removable medium 511 into the drive 510. Alternatively, the program can be received by the communication unit 509 via a wired or wireless transmission medium, and then installed in the recording unit 508. In addition to the above, the program may be installed in advance in the ROM 502 or the recording unit 508.

It should also be appreciated that the program executed by the computer may be a program wherein processes are conducted in a time series following the order described in the present specification, or a program wherein processes are conducted in parallel or at appropriate timings, such as when called.

The present application contains subject matter related to that disclosed in Japanese Priority Patent Application JP 2008-258011 filed in the Japan Patent Office on Oct. 3, 2008, and in Japanese Priority Patent Application JP 2009-055061 filed in the Japan Patent Office on Mar. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   detecting means configured to detect a target object image region from a first image, the detecting means including:
      generating means configured to generate images having scale coefficients differing from scale coefficients of the first image;
      extracting means configured to extract feature points from the generated images;
      calculating means configured to calculate feature values for the feature points by filtering the feature points using a predetermined filter, the detecting means detecting the target object by substituting the feature values into a classifier;
   setting means configured to set the target object image region as a first region and a remaining region of the first image as a second region, based on a parameter applicable to a target object within the target object image region;
   removing means configured to remove one of the first region or the second region from the first image; and
   generating means configured to generate a second image by superimposing the removed region on a third image.

2. The image processing apparatus according to claim 1, wherein the parameter is a first parameter indicating that the target object is detected to be a human, but a face is not detected.

3. The image processing apparatus according to claim 2, wherein the setting means is further configured to set the target object image region based on a second parameter indicating that the target object is not a registered target object.

4. The image processing apparatus according to claim 3, wherein the setting means is further configured to set the target object image region based on a third parameter indicating that the target object is a non-smiling human.

5. The image processing apparatus according to claim 4, wherein the third image is obtained before obtaining the first image.

6. The image processing apparatus according to claim 4, wherein:
   the removing means is configured to remove the second region; and
   the generating means is configured to generate the third image by replacing the second region with portions of a fourth image.

7. The image processing apparatus according to claim 4, wherein the removed region is the first region and the generating means is configured to pixelize the first region.

8. The image processing apparatus according to claim 4, wherein the removed region is the first region and the generating means is configured to generate the third image by pixelizing the second region.

9. An image processing method executed by an image processing apparatus, the method comprising the steps of:
generating images having scale coefficients differing from scale coefficients of a first image;
extracting feature points from the generated images;
calculating feature values for the feature points by filtering the feature points using a predetermined filter;
detecting a target object image region from the first image by substituting the feature values into a classifier;
setting the target object image region as a first region and setting a remaining region of the first image as a second region, based on a parameter applicable to a target object within the target object image region;
removing one of the first region or the second region from the first image; and
generating a second image by superimposing the removed region on a third image.

10. A non-transitory computer-readable medium comprising instructions for causing a computer to execute processing comprising the steps of:
generating images having scale coefficients differing from scale coefficients of a first image;
extracting feature points from the generated images;
calculating feature values for the feature points by filtering the feature points using a predetermined filter;
detecting a target object image region from the first image by substituting the feature values into a classifier;
setting the target object image region as a first region and setting a remaining region of the first image as a second region, based on a parameter applicable to a target object within the target object image region;
removing one of the first region or the second region from the first image; and
generating a second image by superimposing the removed region on a third image.

11. An image processing apparatus, comprising:
a detector configured to detect a target object image region from a first image, the detector including:
a generator configured to generate images having scale coefficients differing from scale coefficients of the first image;
an extracting unit configured to extract feature points from the generated images;
a feature value calculator configured to calculate feature values for the feature points by filtering the feature points using a predetermined filter, the detector detecting the target object by substituting the feature values into a classifier;
a setting unit configured to set the target object image region as a first region and a remaining region of the first image as a second region, based on a parameter applicable to a target object within the target object image region;
an image remover configured to remove one of the first region or the second region from the first image; and
an image generator configured to generate a second image by superimposing the removed region on a third image.

12. The image processing apparatus according to claim 11, wherein the parameter is a first parameter indicating that the target object is detected to comprise features of a human other than a human face.

13. The image processing apparatus according to claim 11, wherein the setting unit is further configured to set the target object image region based on a second parameter indicating that the target object is not a registered target object.

14. The image processing apparatus according to claim 11, wherein the third image is obtained before obtaining the first image.

15. The image processing method according to claim 9, wherein the removed region is the second region and the generating step includes generating the third image by replacing the second region with portions of a fourth image.

16. The image processing method according to claim 9 wherein:
the removing step includes removing the first region from the first image; and
the generating step includes generating the third image by superimposing the second region on portions of a fourth image.

17. The image processing method according to claim 9, wherein the generating step includes pixelizing the first region.

18. The image processing method according to claim 9, wherein the generating step includes generating the third image by pixelizing the second region.

* * * * *

UNITED STATES PATENT AND TRADEMARK OFFICE
CERTIFICATE OF CORRECTION

Page 1 of 1

PATENT NO.        : 8,582,806 B2
APPLICATION NO.   : 12/571923
DATED             : November 12, 2013
INVENTOR(S)       : Yokono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this
Twenty-first Day of April, 2015

Michelle K. Lee
*Director of the United States Patent and Trademark Office*